(12) United States Patent
Yanagisawa et al.

(10) Patent No.: US 11,082,845 B2
(45) Date of Patent: Aug. 3, 2021

(54) TERMINAL APPARATUS, DEVICE, AND NON-TRANSITORY COMPUTER-READABLE RECORDING MEDIUM

(71) Applicant: SEIKO EPSON CORPORATION, Tokyo (JP)

(72) Inventors: Kazuki Yanagisawa, Chino (JP); Junpei Koizumi, Matsumoto (JP); Kenji Sakuda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/362,952

(22) Filed: Mar. 25, 2019

(65) Prior Publication Data

US 2019/0306713 A1    Oct. 3, 2019

(30) Foreign Application Priority Data

Mar. 27, 2018  (JP) .............................. JP2018-059833
May 24, 2018  (JP) .............................. JP2018-100061

(51) Int. Cl.
| | |
|---|---|
| *H04W 12/06* | (2021.01) |
| *H04W 4/80* | (2018.01) |
| *H04W 76/11* | (2018.01) |
| *H04W 88/02* | (2009.01) |
| *H04W 88/08* | (2009.01) |
| *H04W 48/16* | (2009.01) |
| *H04W 84/12* | (2009.01) |

(Continued)

(52) U.S. Cl.
CPC ........... *H04W 12/068* (2021.01); *H04W 4/80* (2018.02); *H04W 48/16* (2013.01); *H04W 76/11* (2018.02); *H04W 88/02* (2013.01); *H04W 88/08* (2013.01); *G06F 3/1204* (2013.01); *G06F 3/1236* (2013.01); *H04W 12/00* (2013.01); *H04W 84/12* (2013.01); *H04W 88/04* (2013.01); *H04W 88/06* (2013.01)

(58) Field of Classification Search
CPC .................................................. H04W 12/0608
See application file for complete search history.

(56) References Cited

U.S. PATENT DOCUMENTS

2010/0067406 A1  3/2010  Suzuki
2014/0362841 A1  12/2014  Shibata
(Continued)

FOREIGN PATENT DOCUMENTS

JP    2011-188518 A    9/2011

OTHER PUBLICATIONS

European Search Report issued in Application No. EP19165258, dated Aug. 13, 2019.

*Primary Examiner* — Edan Orgad
*Assistant Examiner* — Won Tae C Kim
(74) *Attorney, Agent, or Firm* — Workman Nydegger

(57) ABSTRACT

When a terminal apparatus establishes second wireless communication with an access point in compliance with a second wireless communication scheme, a terminal control unit transmits a first network identifier of the access point, the second wireless communication with which is established by the terminal apparatus, to a device. When a first network identifier is included in a list of network identifiers that are acquired by the device by searching a wireless communication network in compliance with a second wireless communication scheme, the terminal control unit causes a first password input screen to be displayed.

8 Claims, 10 Drawing Sheets

(51) Int. Cl.
*G06F 3/12* (2006.01)
*H04W 12/00* (2021.01)
*H04W 88/04* (2009.01)
*H04W 88/06* (2009.01)

(56) References Cited

U.S. PATENT DOCUMENTS

| | | |
|---|---|---|
| 2017/0070951 A1 | 3/2017 | Takeuchi |
| 2017/0208431 A1 | 7/2017 | Suzuki |
| 2017/0215067 A1 | 7/2017 | Goto |
| 2017/0223748 A1 | 8/2017 | Sumiuchi |
| 2018/0332634 A1* | 11/2018 | Kawaura ................. G06F 3/122 |

* cited by examiner

FIG. 2

Wi-Fi BEACON

|  | NETWORK INFORMATION |  |
|  | SSID |  |

| ITEM NO | SSID |
|---|---|
| 1 | abc3 |
| 2 | xyz4 |
| 3 | pqr7 |
| ⋮ | ⋮ |

TERMINAL APPARATUS, DEVICE, AND NON-TRANSITORY COMPUTER-READABLE RECORDING MEDIUM

BACKGROUND

1. Technical Field

The present invention relates to a terminal apparatus, a device, and a non-transitory computer-readable recording medium.

2. Related Art

In JP-A-2011-188518, a technology is disclosed in which by operating an operation unit, a user selects a service set identifier (SSID) of a connection target from among SSIDs that are displayed on a display unit of a multi-function machine which is capable of making a connection to a wireless local area network (LAN) and that the multi-function machine thus makes a wireless connection to an access point (AP) that is a connection target. JP-A-2011-188518 is an example of the related art.

Some users are not familiar with operating of a touch panel of a multi-function machine and a printing device. This is because there is less opportunity for the operating when compared with a touch panel of a smartphone or a tablet PC. It is a big burden to operate the touch panel of the multi-function machine or the printing device and thus to perform wireless setting.

Furthermore, even if the user is familiar with the operating of the touch panel of the multi-function machine or the printing device, when the touch panel is small, it is difficult for the user to select an SSID and input a password of the SSID, and the user finds the wireless setting burdensome.

Needless to say, if a touch panel is not attached to the multi-function machine or the printing device, with the access point, the user cannot even cause the multi-function machine or the printing device to make a wireless connection to the access point.

Due to this situation, a technology is demanded that assists the user in causing a device to make a wireless connection the access point.

SUMMARY

With this configuration, when the terminal apparatus is wirelessly connected to the access point, in a case where the first network identifier is present in the list of network identifiers, the first network identifier and the first password that is input by a user through the operation unit of the terminal apparatus are transmitted from the terminal apparatus to the device and the device can establish the third wireless communication with the access point of which the first network identifier is identified, based on the first network identifier and the first password. On the other hand, when the terminal apparatus is not wirelessly connected to the access point, the list of network identifiers is sent from the device to the terminal apparatus in response to the request from the terminal apparatus, the second network identifier that is selected from the list of network identifiers and the second password that is input by the user through the operation unit of the terminal apparatus are transmitted from the terminal apparatus to the device, and the device can establish the third wireless communication with the access point of which the second network identifier is identified, based on the second network identifier and the second password. Accordingly, when the device makes a wireless connection to the access point, input of the information that is set to be in the access point can be performed using the terminal apparatus.

According to another aspect of the invention, there is provided a terminal apparatus that establishes first wireless communication with a device using a first wireless communication scheme, the terminal apparatus including: a second wireless communication unit that performs processing which establishes second wireless communication with an access point on a wireless communication network using a second wireless communication scheme; a display unit on which a screen is displayed; an operation unit that receives input from the screen; and a terminal control unit, in which the terminal control unit performs first determination processing which determines whether or not the second wireless communication unit establishes the second wireless communication with the access point, when it is determined that a result of the first determination processing is that the second wireless communication unit establishes the second wireless communication with the access point, the terminal control unit transmits a first network identifier of the access point, the second wireless communication with which is established by the second wireless communication unit, to the device through the first wireless communication, and the terminal control unit causes a first screen for receiving an instruction for wirelessly connecting the device to the access point to which the terminal apparatus is connected, to be displayed on the display unit, when the notification indicating that the first network identifier is included in the list of network identifiers that is stored in the device is received from the device through the first wireless communication, causes a first password input screen to be displayed on the display unit when the instruction is received from the first screen, and transmits the first network identifier and a first password to the device through the first wireless communication when the first password is input from the first password input screen.

With this configuration, in the case where the terminal apparatus is wirelessly connected to the access point, when the first network identifier is present in the list of network identifiers, the first network identifier and the first password that is input by the user through the operation unit of the terminal apparatus are transmitted from the terminal apparatus to the device and the device can establish the third wireless communication with the access point of which the first network identifier is identified, based on the first network identifier and the first password. Accordingly, when the device makes a wireless connection to the access point, the input of the information that is set to be in the access point can be performed using the terminal apparatus.

Furthermore, in the terminal apparatus, the terminal control unit may make a request to the device for the list of network identifiers through the first wireless communication when it is determined that the result of the first determination processing is that the second wireless communication unit does not establish the second wireless communication with the access point, and the terminal control unit may cause any second network identifier to be selected from the list of network identifiers when the list of network identifiers is received from the device through the first wireless communication, may cause a second password input screen to be displayed on the display unit when the second network identifier is selected, and may transmit the second network identifier and a second password to the device through the first wireless communication when the second password is input from the second password input screen.

With this configuration, when the terminal apparatus is not wirelessly connected to the access point, the list of network identifiers is sent from the device to the terminal apparatus in response to the request from the terminal apparatus, the second network identifier that is selected from the list of network identifiers and the second password that is input by the user through the operation unit of the terminal apparatus are transmitted from the terminal apparatus to the device, and the device can establish the third wireless communication with the access point of which the second network identifier is identified, based on the second network identifier and the second password. Accordingly, when the device makes a wireless connection to the access point, the input of the information that is set to be in the access point can be performed using the terminal apparatus.

Furthermore, in the terminal apparatus, when it is determined that the result of the first determination processing is that the second wireless communication unit does not establish the second wireless communication with the access point, the terminal control unit may make a request to the device for wireless setting information that is to be used to establish a fourth wireless communication with the device in compliance with the second wireless communication scheme, through the first wireless communication, and may establish the fourth wireless communication with the device using the wireless setting information that is output from the device.

With this configuration, when the terminal apparatus is not wirelessly connected to the access point, the wireless setting information can be output from the device in response to the request from the terminal apparatus, and the fourth wireless communication can be established between the terminal apparatus and the device using the wireless setting information that is output from the device. Accordingly, with the fourth wireless communication from the terminal apparatus to the device, for example, print data can be transmitted and printing can be simply performed.

Furthermore, in the terminal apparatus, when it is determined that the result of the first determination processing is that the second wireless communication unit does not establish the second wireless communication with the access point, the terminal control unit may make a request to the device for a two-dimensional code that includes a fifth network identifier and a fifth password which are to be used to establish the fourth wireless communication, through the first wireless communication, may cause an image capture module to read the two-dimensional code that is output from the device, may acquire the fifth network identifier and the fifth password from the two-dimensional code that is read by the image capture module, and may establish the fourth wireless communication with the device using the fifth network identifier and the fifth password that are acquired.

With this configuration, when the terminal apparatus is not wirelessly connected to the access point, the two-dimensional code that includes the fifth network identifier and the fifth password can be output from the device in response to the request from the terminal apparatus, and the fourth wireless communication can be established between the terminal apparatus and the device using the fifth network identifier and the fifth password that are acquired from the two-dimensional code which is output from the device and is read by the image capture module. Accordingly, with the fourth wireless communication from the terminal apparatus to the device, for example, the print data can be transmitted and the printing can be simply performed. Furthermore, by reading the two-dimensional code, the fifth network identifier and the fifth password that are to be used to establish the fourth wireless communication can be acquired. Because of this, wireless setting is simple.

Furthermore, in the terminal apparatus, when it is determined that the result of the first determination processing is that the second wireless communication unit does not establish the second wireless communication with the access point, the terminal control unit may make a request to the device for a fifth network identifier and a fifth password that are to be used to establish the fourth wireless communication, through the first wireless communication, may cause a network identifier and password input screen to be displayed on the display unit, and may establish the fourth wireless communication with the device using the fifth network identifier and the fifth password, when the fifth network identifier and the fifth password are input from the network identifier and password input screen.

With this configuration, when the terminal apparatus is not wirelessly connected to the access point, the fifth network identifier and the fifth password can be output from the device in response to the request from the terminal apparatus, and the fourth wireless communication can be established between the terminal apparatus and the device using the fifth network identifier and the fifth password that are output from the device. Accordingly, with the fourth wireless communication from the terminal apparatus to the device, for example, the print data can be transmitted and the printing can be simply performed.

Furthermore, in the terminal apparatus, when it is determined that the result of the first determination processing is that the second wireless communication unit does not establish the second wireless communication with the access point, the terminal control unit may make a request to the device for a device name of the device, which is to be used to establish the fourth wireless communication, through the first wireless communication, may cause a device name selection screen to be displayed on the display unit, and may establish the fourth wireless communication with the device using the selected device name when the device name of the device selected from the device name selection screen is received.

With this configuration, when the terminal apparatus is not wirelessly connected to the access point, the device name of the device can be output from the device in response to the request from the terminal apparatus, and the fourth wireless communication can be established between the terminal apparatus and the device using the device name of the device that is output from the device. Accordingly, with the fourth wireless communication from the terminal apparatus to the device, for example, the print data can be transmitted and the printing can be simply performed. Furthermore, with the selection of the device name of the device, the fourth wireless communication can be established. Because of this, the wireless setting is simple.

Furthermore, in the terminal apparatus, the terminal control unit may make a request to the device for the list of network identifiers through the first wireless communication when a notification indicating that the first network identifier is not included in the list of network identifiers which is stored in the device is received from the device through the first wireless communication, and the terminal control unit may cause any third network identifier to be selected from the list of network identifiers when the list of network identifiers is received from the device through the first wireless communication, may cause a third password input screen to be displayed on the display unit when the third network identifier is selected, and may transmit the third network identifier and the third password to the device through the first wireless communication when a third password is input from the third password input screen.

With this configuration, in the case where the terminal apparatus is wirelessly connected to the access point, when the first network identifier is not present in the list of network identifiers, the list of network identifiers can be sent from the device to the terminal apparatus in response to the request from the terminal apparatus, the third network identifier that is selected from the list of network identifiers and the third password that is input by the user through the operation unit of the terminal apparatus can be transmitted from the terminal apparatus to the device, and the device can establish the third wireless communication with the access point of which the third network identifier is identified, based on the third network identifier and the third password. Accordingly, when the device makes a wireless connection to the access point, the input of the information that is set to be in the access point can be performed using the terminal apparatus.

Furthermore, in the terminal apparatus, the terminal control unit may cause a fourth network identifier and fourth password input screen to be displayed on the display unit when the list of network identifiers and stealth access point information indicating that the network identifier of the access point which operates in a stealth mode is included in the list of the network identifiers are received from the device through the first wireless communication, and may transmit the fourth network identifier and the fourth password to the device through the first wireless communication when the fourth network identifier and the fourth password are in from the fourth network identifier and fourth password input screen.

With this configuration, when the network identifier of which a value is NULL and of which a length is 0 is included in the list of network identifiers, the stealth access point information can be sent from the device to the terminal apparatus, the fourth network identifier and the fourth password that are input by the user through the operation unit of the terminal apparatus can be transmitted from the terminal apparatus to the device, and the device can establish the third wireless communication with the access point of which the fourth network identifier is identified, based on the fourth network identifier and the fourth password. Accordingly, when the device makes a wireless connection to the access point, the input of the information that is set to be in the access point can be performed using the terminal apparatus. Furthermore, the user can cause the device to be connected to the wireless communication network using a stealth access point.

Furthermore, the terminal apparatus may be the terminal apparatus performing processing that exchanges a message which is determined in advance according to a second rule different from a first rule that is determined with pairing standards for the first wireless communication, through the first wireless communication with the device, performing information transmission and reception through the first wireless communication with the device when the device has sent the message that is determined in advance according to the second rule, to the terminal apparatus, and not performing the information transmission and reception through the first wireless communication with the device when the device does not have sent the message that is determined in advance according to the second rule, to the terminal apparatus.

With this configuration, a partner that exchanges information between the terminal apparatus and the device can be limited to only a partner that has sent the messages that are determined in advance according to the second rule that is different from the first rule which is determined with the pairing standards for the first wireless communication. Accordingly, because the legitimacy of the partner that exchanges the information through the first wireless communication is verified, the security of the information that is exchanged through the first wireless communication is improved.

According to still another aspect of the invention, there is provided a device that establishes first wireless communication with a terminal apparatus using a first wireless communication scheme, the device including: a third wireless communication unit that performs processing which establishes third wireless communication with an access point on a wireless communication network using a second wireless communication scheme; and a device control unit, in which the device control unit determines whether or not a first network identifier that is received from the terminal apparatus through the first wireless communication is included in a list of network identifiers that is acquired by the third wireless communication unit by searching the wireless communication network in compliance with the second wireless communication scheme, and when it is determined that the first network identifier is included in the list of network identifiers, transmits a notification indicating that the first network identifier is included in the list of network identifiers, to the terminal apparatus through the first wireless communication, and causes the third wireless communication unit to establish the third wireless communication with the access point of which the first network identifier is identified, based on the first network identifier and a first password that are received from the terminal apparatus through the first wireless communication.

With this configuration, in the case where the terminal apparatus is wirelessly connected to the access point, when the first network identifier is present in the list of network identifiers, the first network identifier and the first password that is input by the user through the operation unit of the terminal apparatus are transmitted from the terminal apparatus to the device and the device can establish the third wireless communication with the access point of which the first network identifier is identified, based on the first network identifier and the first password. Accordingly, when the device makes a wireless connection to the access point, the input of the information that is set to be in the access point can be performed using the terminal apparatus.

Furthermore, in the device according to the aspect of the invention, the device control unit may transmit the list of network identifiers to the terminal apparatus through the first wireless communication, in response to a request for the list of network identifiers from the terminal apparatus that does not establish a second wireless communication with the access point using the second wireless communication scheme, and the device control unit may cause the third wireless communication unit to establish the third wireless communication with the access point of which a second network identifier is identified, based on the second network identifier and a second password that are received from the terminal apparatus through the first wireless communication.

With this configuration, when the terminal apparatus is not wirelessly connected to the access point, the list of network identifiers is sent from the device to the terminal apparatus in response to the request from the terminal apparatus, the second network identifier that is selected from the list of network identifiers and the second password that is input by the user through the operation unit of the terminal apparatus are transmitted from the terminal apparatus to the device, and the device can establish the third wireless communication with the access point of which the second network identifier is identified, based on the second network identifier and the second password. Accordingly, when the device makes a wireless connection to the access point, the input of the information that is set to be in the access point can be performed using the terminal apparatus.

Furthermore, in the device, the device control unit may output wireless setting information in response to a request for the wireless setting information that is to be used to establish fourth wireless communication with the device in compliance with the second wireless communication scheme, from the terminal apparatus that does not establish second wireless communication with the access point using the second wireless communication scheme, and the device control unit may establish the fourth wireless communication with the terminal apparatus using the wireless setting information that is output from the device.

With this configuration, when the terminal apparatus is not wirelessly connected to the access point, the wireless setting information can be output from the device in response to the request from the terminal apparatus, and the fourth wireless communication can be established between the terminal apparatus and the device using the wireless setting information that is output from the device. Accordingly, with the fourth wireless communication from the terminal apparatus to the device, for example, the print data can be transmitted and the printing can be simply performed.

Furthermore, in the device, the device control unit may output a two-dimensional code in response to a request for the two-dimensional code that includes a fifth network identifier and a fifth password that are to be used to establish the fourth wireless communication, from the terminal apparatus that does not establish second wireless communication with the access point using the second wireless communication scheme, and the device control unit may establish the fourth wireless communication with the terminal apparatus using the fifth network identifier and the fifth password that are included in the two-dimensional code that is output from the device.

With this configuration, when the terminal apparatus is not wirelessly connected to the access point, the two-dimensional code that includes the fifth network identifier and the fifth password can be output from the device in response to the request from the terminal apparatus, and the fourth wireless communication can be established between the terminal apparatus and the device using the fifth network identifier and the fifth password that are acquired from the two-dimensional code which is output from the device. Accordingly, with the fourth wireless communication from the terminal apparatus to the device, for example, the print data can be transmitted and the printing can be simply performed. Furthermore, by reading the two-dimensional code, the fifth network identifier and the fifth password that are to be used to establish the fourth wireless communication can be acquired. Because of this, wireless setting is simple.

Furthermore, in the device, the device control unit may output a fifth network identifier and a fifth password in response to a request for the fifth network identifier and the fifth password that are to be used to establish the fourth wireless communication, from the terminal apparatus that does not establish second wireless communication with the access point using the second wireless communication scheme, and the device control unit may establish the fourth wireless communication with the terminal apparatus using the fifth network identifier and the fifth password that are output from the device.

With this configuration, when the terminal apparatus is not wirelessly connected to the access point, the fifth network identifier and the fifth password can be output from the device in response to the request from the terminal apparatus, and the fourth wireless communication can be established between the terminal apparatus and the device using the fifth network identifier and the fifth password that are output from the device. Accordingly, with the fourth wireless communication from the terminal apparatus to the device, for example, the print data can be transmitted and the printing can be simply performed.

Furthermore, in the device, the device control unit may output a device name in response to a request for the device name of the device that is to be used to establish the fourth wireless communication, from the terminal apparatus that does not establish second wireless communication with the access point using the second wireless communication scheme, and the device control unit may establish the fourth wireless communication with the terminal apparatus using the device name that is output from the device.

With this configuration, when the terminal apparatus is not wirelessly connected to the access point, the device name of the device can be output from the device in response to the request from the terminal apparatus, and the fourth wireless communication can be established between the terminal apparatus and the device using the device name of the device that is output from the device. Accordingly, with the fourth wireless communication from the terminal apparatus to the device, for example, the print data can be transmitted and the printing can be simply performed. Furthermore, with the selection of the device name of the device, the fourth wireless communication can be established. Because of this, the wireless setting is simple.

Furthermore, in the device, when it is determined that the first network identifier is not included in the list of network identifiers, the device control unit may transmit a notification indicating that the first network identifier is not included in the list of network identifiers, to the terminal apparatus through the first wireless communication, may transmit the list of network identifiers to the terminal apparatus through the first wireless communication in response to a request for the list of network identifiers from the terminal apparatus, and may cause the third wireless communication unit to establish the third wireless communication with the access point of which a third network identifier is identified, based on the third network identifier and a third password that are received from the terminal apparatus through the first wireless communication.

With this configuration, in the case where the terminal apparatus is wirelessly connected to the access point, when the first network identifier is not present in the list of network identifiers, the list of network identifiers can be sent from the device to the terminal apparatus in response to the request from the terminal apparatus, the third network identifier that is selected from the list of network identifiers and the third password that is input by the user through the operation unit of the terminal apparatus can be transmitted from the terminal apparatus to the device, and the device can establish the third wireless communication with the access point of which the third network identifier is identified, based on the third network identifier and the third password. Accordingly, when the device makes a wireless connection to the access point, the input of the information that is set to be in the access point can be performed using the terminal apparatus.

Furthermore, in the device, when a network identifier of which a value is NULL or of which a length of 0 is included in the list of network identifiers, the device control unit may transmit the list of network identifiers and stealth access point information indicating that the network identifier of the access point which operates in a stealth mode is included in the list of network identifiers, to the terminal apparatus through the first wireless communication, and may cause the third wireless communication unit to establish the third wireless communication with the access point of which a fourth network identifier is identified, based on the fourth network identifier and a fourth password that are received from the terminal apparatus through the first wireless communication.

With this configuration, when the network identifier of which the value is NULL and of which the length is 0 is included in the list of network identifiers, the stealth access point information can be sent from the device to the terminal apparatus, the fourth network identifier and the fourth password that are input by the user through the operation unit of the terminal apparatus can be transmitted from the terminal apparatus to the device, and the device can establish the third wireless communication with the access point of which the fourth network identifier is identified, based on the fourth network identifier and the fourth password. Accordingly, when the device makes a wireless connection to the access point, the input of the information that is set to be in the access point can be performed using the terminal apparatus. Furthermore, the user can cause the device to be connected to the wireless communication network using a stealth access point.

Furthermore, the device may be the device performing processing that exchanges a message which is determined in advance according to a second rule different from a first rule that is determined with pairing standards for the first wireless communication, through the first wireless communication with the terminal apparatus, performs information transmission and reception through the first wireless communication with the terminal apparatus when the terminal apparatus has sent the message that is determined in advance according to the second rule, to the device, and not performing the information transmission and reception through the first wireless communication with the terminal apparatus when the terminal apparatus does not have sent the message that is determined in advance according to the second rule, to the device.

With this configuration, a partner that exchanges information between the terminal apparatus and the device can be limited to only a partner that has sent the messages that are determined in advance according to the second rule that is different from the first rule which is determined with the pairing standards for the first wireless communication. Accordingly, because the legitimacy of the partner that exchanges the information through the first wireless communication is verified, the security of the information that is exchanged through the first wireless communication is improved.

According to still another aspect of the invention, there is provided a non-transitory computer-readable recording medium in which a program is recorded, the program that causes a computer to perform: causing a first wireless communication unit to establish first wireless communication with a device using a first wireless communication scheme; determining whether or not a second wireless communication unit establishes second wireless communication with an access point using a second wireless communication scheme; causing the first wireless communication unit to transmit a first network identifier of the access point to the device through the first wireless communication when it is determined that a result of the determination is the second wireless communication unit establishes second wireless communication with the access point; causing a first screen for receiving an instruction for wirelessly connecting the device to the access point to be displayed on a display unit, when the first wireless communication unit receives a notification indicating that the first network identifier is included in a list of network identifiers that is stored in the device, from the device through the first wireless communication; causing a first password input screen to be displayed on the display unit when the first screen receives the instruction; and causing the first wireless communication unit to transmit the first network identifier and a first password to the device through the first wireless communication, when the first password is input into the first password input screen.

With this configuration, in the case where the terminal apparatus is wirelessly connected to the access point, when the first network identifier is present in the list of network identifiers, the first network identifier and the first password that is input by the user through the operation unit of the terminal apparatus are transmitted from the terminal apparatus to the device and the device can establish the third wireless communication with the access point of which the first network identifier is identified, based on the first network identifier and the first password. Accordingly, when the device makes a wireless connection to the access point, the input of the information that is set to be in the access point can be performed using the terminal apparatus.

BRIEF DESCRIPTION OF THE DRAWINGS

The invention will be described with reference to the accompanying drawings, wherein like numbers reference like elements.

FIG. 2 is a diagram schematically illustrating a Wi-Fi (a registered trademark) beacon.

FIG. 3 is a diagram illustrating an example of a configuration of an SSID list according to the embodiment.

DESCRIPTION OF EXEMPLARY
EMBODIMENTS

Embodiments of the invention will be described in detail below with reference to the drawings.

Figure 1:
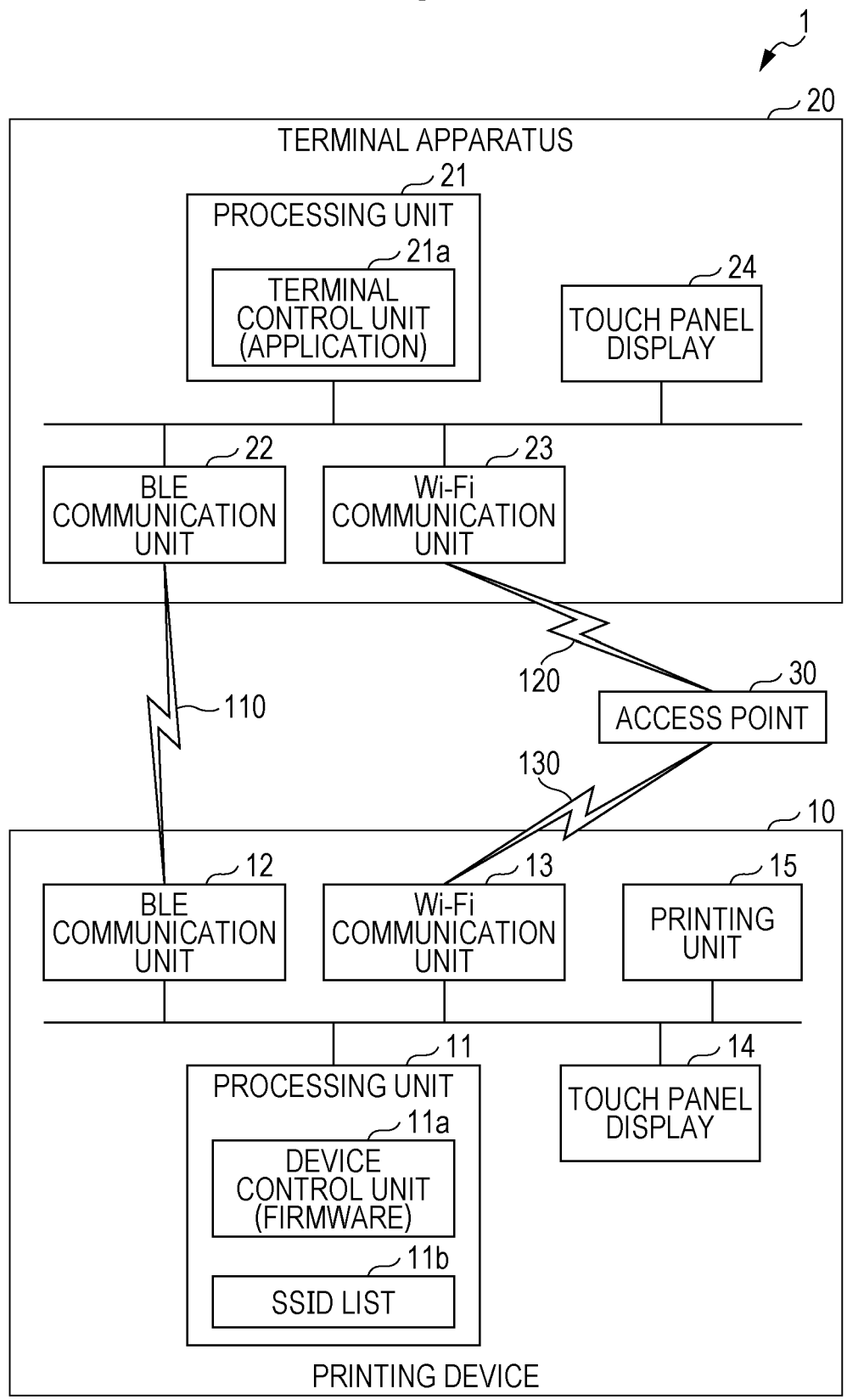
FIG. 1 is a diagram illustrating a schematic configuration of a system according to an embodiment.

FIG. 1 is a diagram illustrating a schematic configuration of a system according to the present embodiment. A system 1 that is illustrated in FIG. 1 includes a printing device 10 and a terminal apparatus 20. In the present embodiment, the printing device 10 corresponds to a device.

The printing device 10 and the terminal apparatus 20 establishes a first wireless communication 110 using a wireless communication scheme that complies with Bluetooth (a registered trademark) Low Energy (BLE) standards. In the present embodiment, the wireless communication scheme that complies with the BLE standards corresponds to a first wireless communication scheme.

The terminal apparatus 20 establishes an access point 30 for a wireless LAN and second wireless communication 120 using a wireless communication scheme that complies with Wi-Fi (a registered trademark) standards. The printing device 10 establishes the access point 30 for the Wireless LAN and a third wireless communication 130 using the wireless communication scheme that complies with the Wi-Fi standards. In the present embodiment, the wireless communication scheme that complies with the Wi-Fi standards corresponds to the second wireless communication scheme.

The access point 30 functions as a wireless LAN router. In FIG. 1, one access point 30 is illustrated, but multiple access points 30 may be present in the vicinity of the printing device 10 and the terminal apparatus 20.

Configuration of the Printing Device

A configuration of the printing device 10 is described with reference to FIG. 1. The printing device 10 includes a processing unit 11, a BLE communication unit 12, a Wi-Fi communication unit 13, a touch panel display 14, and a printing unit 15. By complying with the BLE standards, the BLE communication unit 12 can perform wireless communication with a communication partner at a short distance with lower power than the Wi-Fi communication unit 13. The BLE communication unit 12, for example, is configured with a chip or a module that performs wireless communication in compliance with the BLE standards.

The Wi-Fi communication unit 13 can perform wireless communication with the communication partner by complying with the Wi-Fi standards. The Wi-Fi communication unit 13, for example, is configured with a chip or a module that performs wireless communication in compliance with the Wi-Fi standards. In the present embodiment, the Wi-Fi communication unit 13 corresponds to a third wireless communication unit.

The touch panel display 14 is a user interface that serves as both a display on which various pieces of information is possibly displayed, and a touch panel that detects a touch on the display. The printing unit 15 includes a mechanism that transports a printing medium that is not illustrated, a printing mechanism that prints an image on the printing medium, or the like.

The processing unit 11 includes a CPU and a memory (the memory may be an EEPROM and this is true in the following description), such as a ROM or a RAM, which are not illustrated, and possibly executes a program that is recorded in the memory. The processing unit 11 executes firmware (a program) that is recorded in the memory, and thus realizes a function of a device control unit 11a. The device control unit 11a controls operation of each of the BLE communication unit 12, the Wi-Fi communication unit 13, the touch panel display 14, and the printing unit 15. For example, the device control unit 11a displays an image on the touch panel display 14, and receives input from a user through the touch panel display 14. Furthermore, the device control unit 11a performs image processing on an image that is represented by print data, based on the print data, controls the printing unit 15 and causes the image to be printed in the printing medium. Furthermore, the device control unit 11a controls the BLE communication unit 12, and establishes the first wireless communication 110 with the terminal apparatus 20. Furthermore, the device control unit 11a controls the Wi-Fi communication unit 13 and establishes the third wireless communication 130 with the access point 30.

The processing unit 11 stores an SSID list 11b in the memory. The SSID list 11b is a list of SSIDs that are acquired by the Wi-Fi communication unit 13 by searching a wireless LAN in compliance with the wireless communication scheme that complies with the Wi-Fi standards. In the present embodiment, the wireless LAN with the wireless communication scheme that complies with the Wi-Fi standards corresponds to a wireless communication network in compliance with the second wireless communication scheme. Furthermore, in the present embodiment, an SSID corresponds to a network identifier.

Configuration of the Terminal Apparatus

A configuration of the terminal apparatus 20 is described with reference with FIG. 1. The terminal apparatus 20 includes a processing unit 21, a BLE communication unit 22, a Wi-Fi communication unit 23, and a touch panel display 24. By complying with the BLE standards, the BLE communication unit 22 can perform wireless communication with a communication partner at a short distance with lower power than the Wi-Fi communication unit 23. The BLE communication unit 22, for example, is configured with a chip or a module that performs wireless communication in compliance with the BLE standards.

The Wi-Fi communication unit 23 can perform wireless communication with the communication partner by complying with the Wi-Fi standards. The Wi-Fi communication unit 23, for example, is configured with a chip or a module that performs wireless communication in compliance with the Wi-Fi standards. In the present embodiment, the Wi-Fi communication unit 23 corresponds to a second wireless communication unit.

The touch panel display 24 is a user interface that serves as both a display on which various pieces of information is possibly displayed, and a touch panel that detects a touch on the display. In the present embodiment, the touch panel display 24 corresponds to a display unit and an operation unit. The touch panel display 24 has a function that it performs as a display unit on which an image is displayed, and a function that it performs as an operation unit that receives input from the screen.

The processing unit 21 includes a CPU and a memory, such as a ROM or a RAM, which are not illustrated, and possibly executes a program that is recorded in the memory. The processing unit 21 executes an application (a program) that is recorded in the memory, and thus realizes a function of a terminal control unit 21a. The terminal control unit 21a controls operation of each of the BLE communication unit 22, the Wi-Fi communication unit 23, and the touch panel display 24. For example, the terminal control unit 21a displays an image on the touch panel display 24 and receives input from the user through the touch panel display 24. Furthermore, the terminal control unit 21a controls the BLE communication unit 22 and establishes the first wireless communication 110 with the printing device 10. Furthermore, the terminal control unit 21a controls the Wi-Fi communication unit 23 and establishes the second wireless communication 120 with the access point 30.

The terminal apparatus 20, for example, may be a portable communication terminal apparatus, such as a smartphone or a tablet-type computer (a tablet PC), or may be a stationary terminal apparatus (for example, a stationary personal computer or the like).

Creation of the SSID List

FIG. 2 is a diagram schematically illustrating a Wi-Fi beacon. The Wi-Fi beacon is defined with the Wi-Fi standards, and an SSID is described, as an item of network information, in a portion in which information such as a determined format is described. The access point 30 periodically broadcasts the Wi-Fi beacon. The Wi-Fi communication unit 13 receives the Wi-Fi beacon that is broadcast from the access point 30.

The device control unit 11a acquires the SSID that is included in the Wi-Fi beacon which is received by the Wi-Fi communication unit 13, from the Wi-Fi communication unit 13. The device control unit 11a writes the SSID that is acquired from the Wi-Fi communication unit 13, on the SSID list 11b. At this time, when the SSID that is acquired from the Wi-Fi communication unit 13 is already included in the SSID list 11b, the same SSID is not redundantly written on the SSID list 11b. FIG. 3 illustrates an example of a configuration of an SSID list according to the present embodiment. A value of an SSID that is illustrated in FIG. 3 is a value that is provided for convenience.

The device control unit 11a controls the Wi-Fi communication unit 13, performs reception of the Wi-Fi beacon with a fixed periodicity, and updates the SSID list 11b based on a result of the reception of the Wi-Fi beacon. Accordingly, the SSID list 11b is updated, with a fixed periodicity, with the latest value.

Among the access points 30, there can be present a point that is commonly called "stealth access point (stealth AP)", a value of whose SSID is NULL or a length of whose SSID is 0. Two examples of an SSID that is included in the Wi-Fi beacon that is broadcast from the stealth AP are given as follows.

First Example of the SSID of the Stealth AP

When the value of the SSID is NULL, for example, when the length of the SSID is 4 (SSID Length=4), as the value of the SSID (SSID='\0\0\0\0'), there are as many NULLs (\0) as the length of the SSID.

Second Example of the SSID of the Stealth AP

When the length of the SSID is 0 (SSID Length=0), as the value of the SSID, "SSID=' '".

The device control unit 11a determines whether or not the SSID that is acquired from the Wi-Fi communication unit 13 corresponds to the first example (the value of the SSID is NULL) of the SSID of the stealth AP described above or the second example (the length of the SSID is 0) of the SSID of the stealth AP described above, and, if so, writes "A value of the SSID is NULL" or "A length of the SSID is 0", as the SSID, on the SSID list 11b. In the present embodiment, "A value of the SSID is NULL" or "A length of the SSID is 0" that is written on the SSID list 11b corresponds to stealth access point information.

Operation of the System

Operation of the system 1 according to the present embodiment is described with reference to FIGS. 4 to 7. FIGS. 4 to 7 are sequence charts for describing the operation of the system 1 according to the present embodiment. In FIGS. 4 to 7, an AP refers to the access point 30, a PR refers to the printing device 10, and a TE refers to the terminal apparatus 20.

Figure 4:
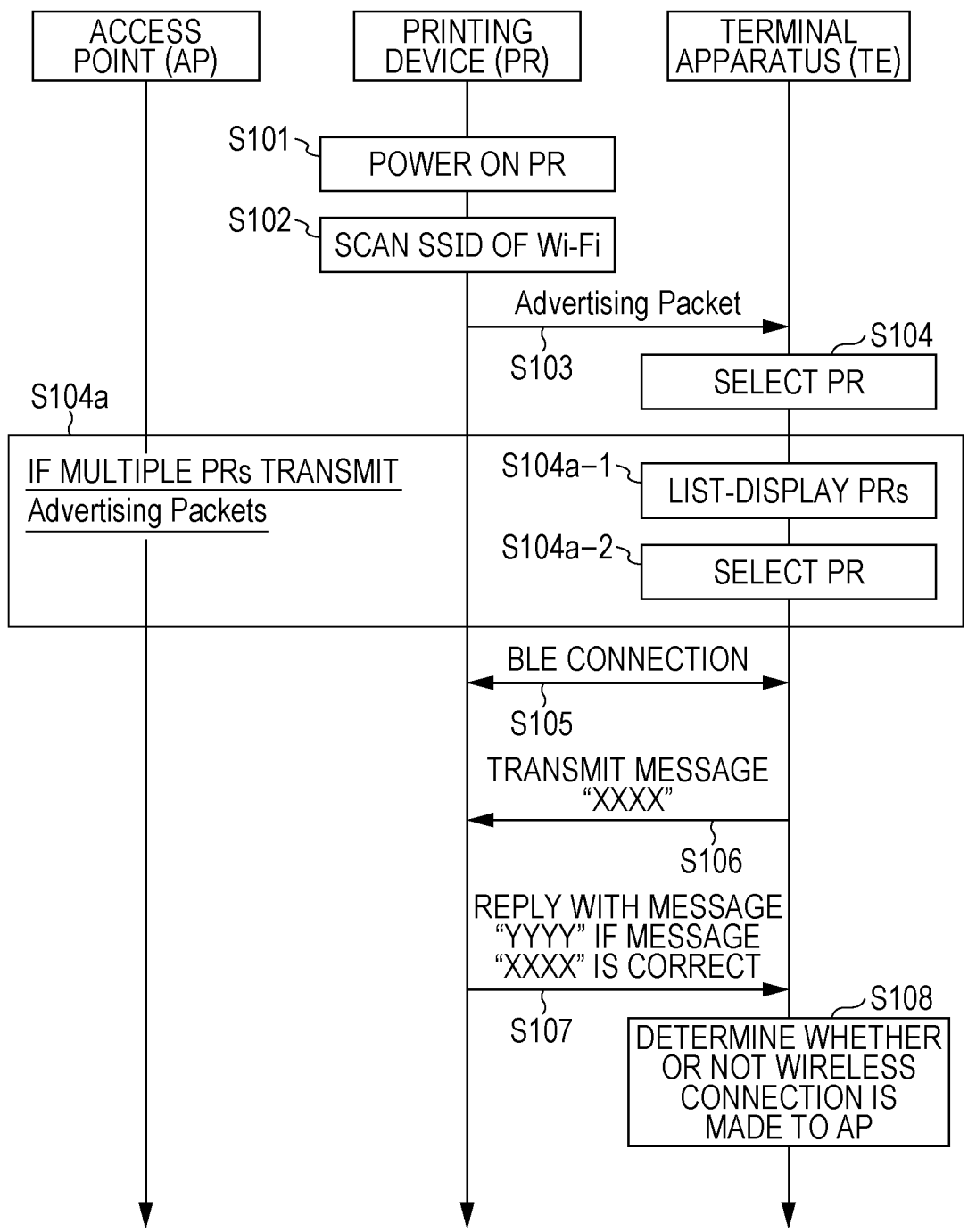
FIG. 4 is a sequence chart for describing operation of the system according to the embodiment.

In FIG. 4, first, the processing unit 21 of the terminal apparatus 20 executes an application and thus a function of the terminal control unit 21a is realized. Furthermore, under the control of a terminal control unit 11b, the BLE communication unit 22 of the terminal apparatus 20 is activated. Furthermore, an SSID and a password of the access point 30 are not set to be in the printing device 10.

Step S101

The printing device 10 is powered on. When the printing device 10 is powered on, the processing unit 11 executes the firmware that is recorded in the memory, and thus a function of the device control unit 11a is realized.

Step S102

The device control unit 11a controls the Wi-Fi communication unit 23, performs reception of the Wi-Fi beacon, and creates the SSID list 11b based on a result of the reception of the Wi-Fi beacon. The device control unit 11a stores the created SSID list 11b in the memory.

Step S103

The device control unit 11a controls the BLE communication unit 12 in such a manner that an advertisement (an advertising packet) is transmitted, as the beacon signal in compliance with the BLE standards.

Step S104

In the terminal apparatus 20, when the advertisement is received by the BLE communication unit 22, the terminal control unit 21a causes a screen for "a notification that inquires if a wireless LAN connection is made to the printing device", to be displayed on the touch panel display 24. When an operation of "approving the wireless LAN connection to the printing device" is performed on the touch panel display 24, the terminal control unit 21a selects the printing device 10 as a partner, the first wireless communication 110 with which is to be established. Thereafter, processing is caused to proceed to Step S105.

It is noted that, when multiple printing devices 10 transmit the advertisement packets, Step S104a (Step S104a-1 and S104a-2).

Step S104a-1

The terminal control unit 21a receives multiple advertisement packets using the BLE communication unit 22, and, when detecting that the multiple printing devices 10, transmit the advertisement packets, causes a list of printing devices 10 to be displayed on the touch panel display 24. The list of the printing devices 10 is one in which the printing devices 10 are shown in order of increasing a distance from the terminal apparatus 20.

At this point, a method of calculating a distance between the terminal apparatus 20 and the printing device 10 is described. The terminal control unit 21a acquires a received signal strength indication (RSSI) of the beacon signal in compliance with the BLE standards using the BLE communication unit 22. Based on the received signal strength indication of the beacon signal in compliance with the BLE standards, which is acquired by the BLE communication unit 22, the terminal control unit 21a obtains the distance to the printing device 10. The terminal control unit 21a compares a signal strength value that is a reference distance, which is included in the beacon signal in compliance with the BLE standards, and the received signal strength indication of the beacon signal in compliance with the BLE standards. The signal strength value that is the reference distance is the received signal strength indication of the beacon signal in compliance with the BLE standards in a receiving side apparatus, which results when the receiving side apparatus is installed at a location that is at the reference distance away from a transmitting side apparatus that transmits the beacon signal in compliance with the BLE standards. When an example is given in which the advertisement packet is used as the beacon signal in compliance with the BLE standards, the transmitting side apparatus is a broadcaster, and the receiving side apparatus is an observer. The reference distance, for example, is 1 m, but may be set to be a different distance.

A description is provided with reference again to FIG. 4.

Step S104a-2

When a user applies an operation of selecting one printing device 10 from the list of printing devices 10, to the touch panel display 24, the terminal control unit 21a selects the selected printing device 10 as a partner, the first wireless communication 110 with which is to be established. Thereafter, processing is caused to proceed to Step S105.

Step S105

The terminal control unit 21a controls the BLE communication unit 22, and establishes the first wireless communication 110 with the printing device 10 that is selected as the partner, the first wireless communication 110 with which is to be established.

Step S106

The terminal control unit 21a transmits a message "XXXX" to the printing device 10 through the first wireless communication 110. The message "XXXX" is generated according to a rule that is determined in advance between an application of the terminal apparatus 20 and firmware of the printing device 10.

Step S107

In the printing device 10, the device control unit 11a determines whether or not the message "XXXX" that is received from the terminal apparatus 20 through the first wireless communication 110 is correct. Whether or not the message "XXXX" is correct is determined according to the rule that is determined in advance between the application of the terminal apparatus 20 and the firmware of the printing device 10. When it is determined that the message "XXXX" is correct, the device control unit 11a replies to the terminal apparatus 20 with a message "YYYY" through the first wireless communication 110. Whether or not the message "YYYY" is correct is determined according to the rule that is determined in advance between the application of the terminal apparatus 20 and the firmware of the printing device 10.

In the terminal apparatus 20, the terminal control unit 21a determines whether or not the message "YYYY" that is received from the printing device 10 through the first wireless communication 110 is correct. Whether or not the message "YYYY" is correct is determined according to the rule that is determined in advance between the application of the terminal apparatus 20 and the firmware of the printing device 10. When it is determined that the message "YYYY" is correct, the terminal control unit 21a determines that exchange of information with the printing device 10 is performed through the first wireless communication 110. On the other hand, when it is determined that the message "YYYY" is not correct, the terminal control unit 21a determines that the exchange of the information with the printing device 10 is performed throughout the first wireless communication 110.

It is noted that the order of Steps 106 and S107 described above may be reversed. First, the message "XXXX" is transmitted from the printing device 10 to the terminal apparatus 20, and, when the terminal apparatus 20 determines that the message "XXXX" is correct, the terminal apparatus 20 responds to the printing device 10 with the message "YYYY". In the printing device 10, when it is determined that the message "YYYY" is correct, the device control unit 11a determines that the exchange of the information with the terminal apparatus 20 is performed through the first wireless communication 110. On the other hand, when it is determined that the message "YYYY" is not correct, the device control unit 11a determines that the exchange of the information with the terminal apparatus 20 is not performed through the first wireless communication 110.

At this point, it is assumed that the result of performing Steps S106 and S107 described above is that the terminal apparatus 20 and the printing device 10 performs the exchange of the information through the first wireless communication 110.

Step S108

In the terminal apparatus 20, the terminal control unit 21a determines whether or not the Wi-Fi communication unit 23 establishes the second wireless communication 120 with the access point 30. In the present embodiment, Step S108 corresponds to first determination processing. When the result of the determination in Step S108 is that the Wi-Fi communication unit 23 establishes the second wireless communication 120 with the access point 30, the processing is caused to proceed to Step S200 in FIG. 5. On the other hand, when the result of the determination in Step S108 is that the Wi-Fi communication unit 23 does not establish the second wireless communication 120 with the access point 30, the processing is caused to proceed to Step S300 in FIG. 6. Case where the Terminal Apparatus is Wirelessly Connected to the Access Point Step S200 is described with reference to FIG. 5.

Step S201

In the terminal apparatus 20, the terminal control unit 21a transmits an SSID (hereafter referred to a first SSID) of the access point 30, the second wireless communication 120 with which is established by the Wi-Fi communication unit 23, to the printing device 10 through the first wireless communication 110.

Step S202

In the printing device 10, the device control unit 11a determines whether or not the first SSID that is received from the terminal apparatus 20 through the first wireless communication 110 is included in the SSID list 11b. When it is determined that the first SSID is included in the SSID list 11b, the device control unit 11a transmits a notification that acknowledgment of the first SSID succeeds, to the terminal apparatus 20 through the first wireless communication 110. On the other hand, when it is determined that the first SSID is not included in the SSID list 11b, the device control unit 11a transmits a notification that the acknowledgment of the first SSID fails, to the terminal apparatus 20 through the first wireless communication 110.

Step S203

In the terminal apparatus 20, the terminal control unit 21a acknowledges the notification of the result of the acknowledgment of the first SSID that is received from the printing device 10 through the first wireless communication 110. When the result of the acknowledgment of the notification is that the acknowledgment of the first SSID succeeds, the processing is caused to proceed to Step S210. On the other hand, when the result of the acknowledgment of the notification is that the acknowledgment of the first SSID fails, the processing is caused to proceed to Step S220. When the First SSID Is Present in the SSID List in a Case where the Terminal Apparatus Is Wirelessly Connected to the Access Point Step S210 is described.

Step S211

In the terminal apparatus 20, the terminal control unit 21*a* causes a first screen for receiving an instruction for wirelessly connecting the printing device 10 to the access point 30 to which the terminal apparatus 20 itself is connected, to be displayed on the touch panel display 24. When the instruction is input through the first screen, the processing is caused to proceed to Step S401 to FIG. 7.

Figure 7:
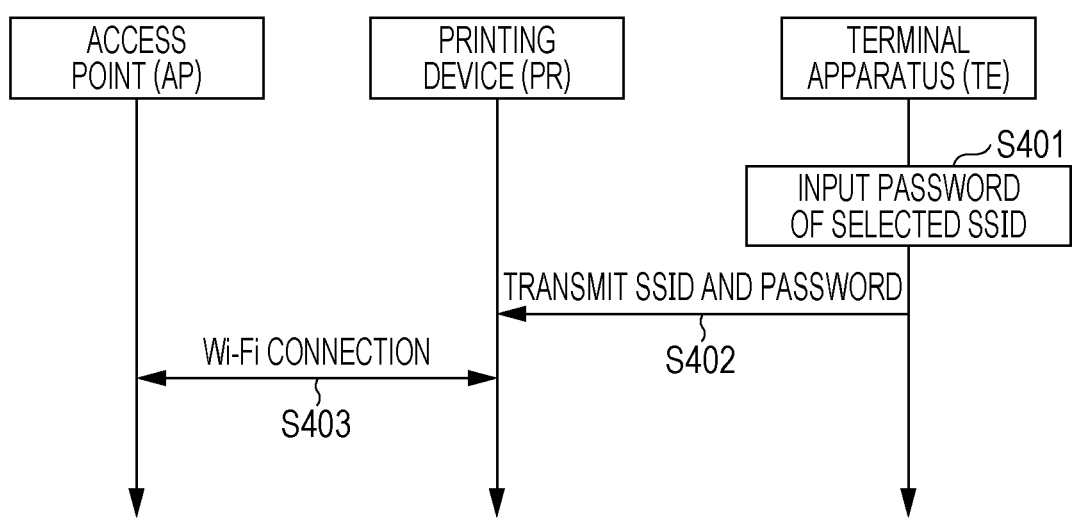
FIG. 7 is a sequence chart for describing operation of the system according to the embodiment.

A focus is shifted to a description that is to be provided with reference to FIG. 7.

Step S401

When the instruction is received through the first screen, the terminal control unit 21*a* causes a password input screen (a first password input screen) to be displayed on the touch panel display 24. A password (hereinafter referred to a first password) of the first SSID is input from the password input screen into the terminal control unit 21*a*.

Step S402

The terminal control unit 21*a* transmits the first SSID and the first password to the printing device 10 through the first wireless communication 110.

Step S403

In the printing device 10, the device control unit 11*a* causes the Wi-Fi communication unit 13 to establish the third wireless communication 130 with the access point 30, based on the first SSID and the first password that are received from the terminal apparatus 20 through the first wireless communication 110.

Figure 5:
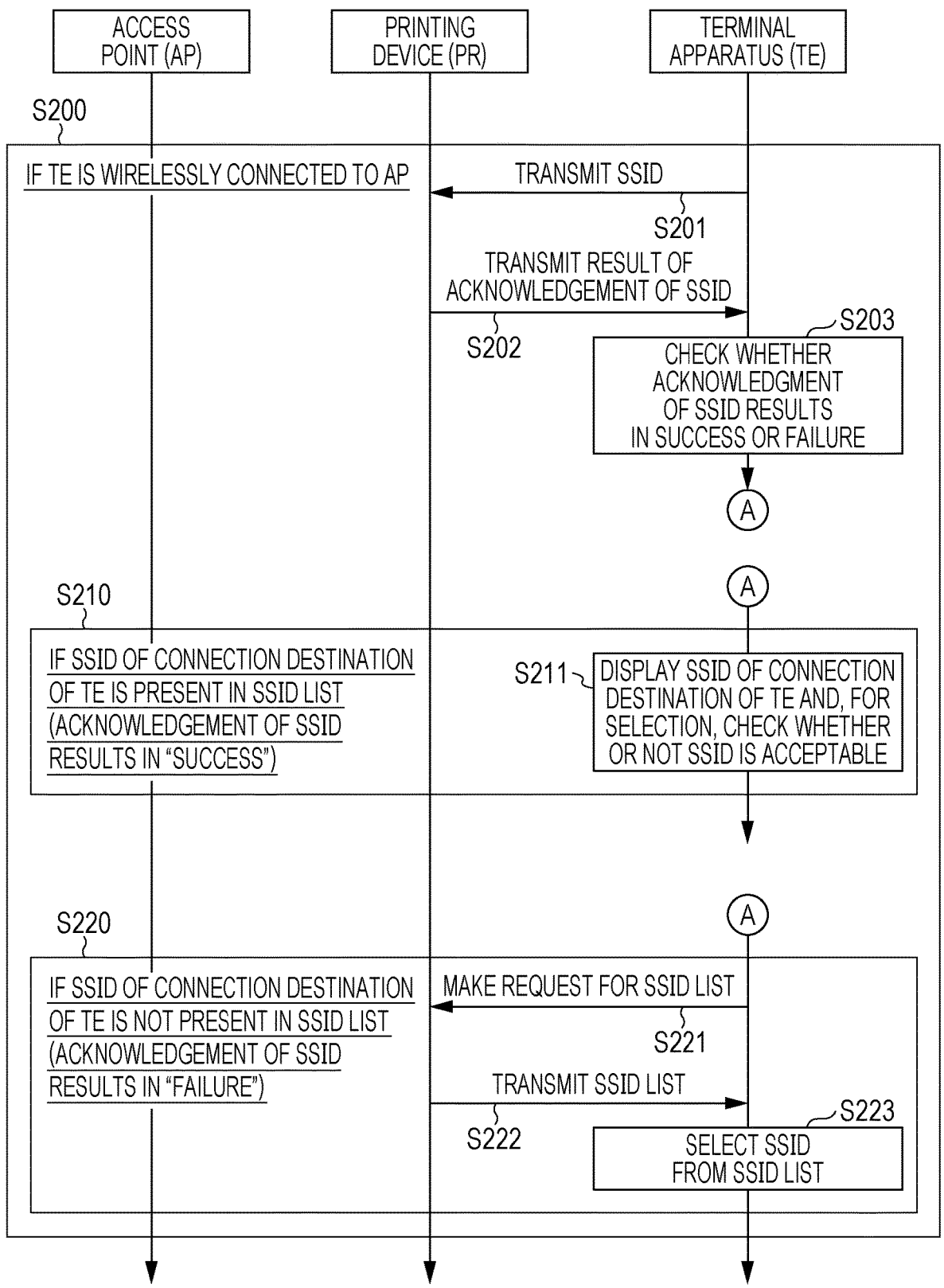
FIG. 5 is a sequence chart for describing the operation of the system according to the embodiment.

It is noted that, when the terminal apparatus 20 is wirelessly connected to the access point 30, in a case where the first SSID is present in the SSID list 11*b* of the printing devices 10, the terminal apparatus 20 does not make a request to the printing device 10 for the SSID list 11*b*. This serves the object of shortening at least the time the user waits because it takes time to transmit the SSID list 11*b* at a communication speed in compliance with the wireless communication scheme that complies with the BLE standards. When the First SSID is Not Present in the SSID List in a Case where the Terminal Apparatus Is Wirelessly Connected to the Access Point Step S220 in FIG. 5 is described.

Step S221

In the terminal apparatus 20, the terminal control unit 21*a* makes a request to the printing device 10 for the SSID list 11*b* through the first wireless communication 110.

Step S222

In the printing device 10, in response to a request from the terminal apparatus 20 for the SSID list 11*b*, the device control unit 11*a* transmits the SSID list 11*b*, which is stored in the memory of the processing unit 11, to the terminal apparatus 20 through the first wireless communication 110.

Step S223

In the terminal apparatus 20, when any SSID (hereinafter referred to as a third SSID) is selected from the SSID list 11*b* that is received from the printing device 10 through the first wireless communication 110, the terminal control unit 21*a* causes the processing to proceed to Step S401 in FIG. 7.

A focus is shifted to a description that is to be provided with reference to FIG. 7.

Step S401

When the third SSID is selected, the terminal control unit 21*a* causes a password input screen (a third password input screen) to be displayed on the touch panel display 24. A password (hereinafter referred to a third password) of the third SSID is input from the password input screen into the terminal control unit 21*a*.

Step S402

The terminal control unit 21*a* transmits the third SSID and the third password to the printing device 10 through the first wireless communication 110.

Step S403

In the printing device 10, the device control unit 11*a* causes the Wi-Fi communication unit 13 to establish the third wireless communication 130 with the access point 30, based on the third SSID and the third password that are received from the terminal apparatus 20 through the first wireless communication 110.

The selection of the third SSID in Step S223 described above is made using the following method (1) and method (2).

(1) When only one SSID is present in the SSID list 11*b*, the terminal control unit 21*a* selects the one SSID as the third SSID. However, the one SSID is limited to a case where "A value of the SSID is not NULL" or where "A length of the SSID is 0".

(2) When multiple SSIDs are present in the SSID list 11*b*, the terminal control unit 21*a* causes a screen for the SSID list 11*b* to be displayed on the touch panel display 24. When the user applies an operation of selecting one SSID from the SSID list 11*b* to the touch panel display 24, the terminal control unit 21*a* selects the selected SSID as the third SSID. When "A value of the SSID is NULL" or "A Length of the SSID is 0" Is Written, as the SSID of the Stealth AP, on the SSID List that Is Received by the Terminal Apparatus from the Printing Device It is noted that, when "A value of the SSID is NULL", or "A length of the SSID is 0" is written, as the SSID, on the SSID list 11*b*, the terminal control unit 21*a* causes an SSID and password input screen (a fourth password input screen) to be displayed on the touch panel display 24. When an SSID (hereinafter referred to as a fourth SSID) and a password (hereinafter referred to as a fourth password) is input from the SSID and password input screen, the terminal control unit 21*a* causes the processing to proceed to Step S402 in FIG. 7. Subsequently, in Step S402, the terminal control unit 21*a* transmits the fourth SSID and the fourth password to the printing device 10 through the first wireless communication 110. Subsequently, in Step S403, in the printing device 10, the device control unit 11*a* causes the Wi-Fi communication unit 13 to establish the third wireless communication 130 with the access point 30, based on the fourth SSID and the fourth password that are received from the terminal apparatus 20 through the first wireless communication 110.

Figure 6:
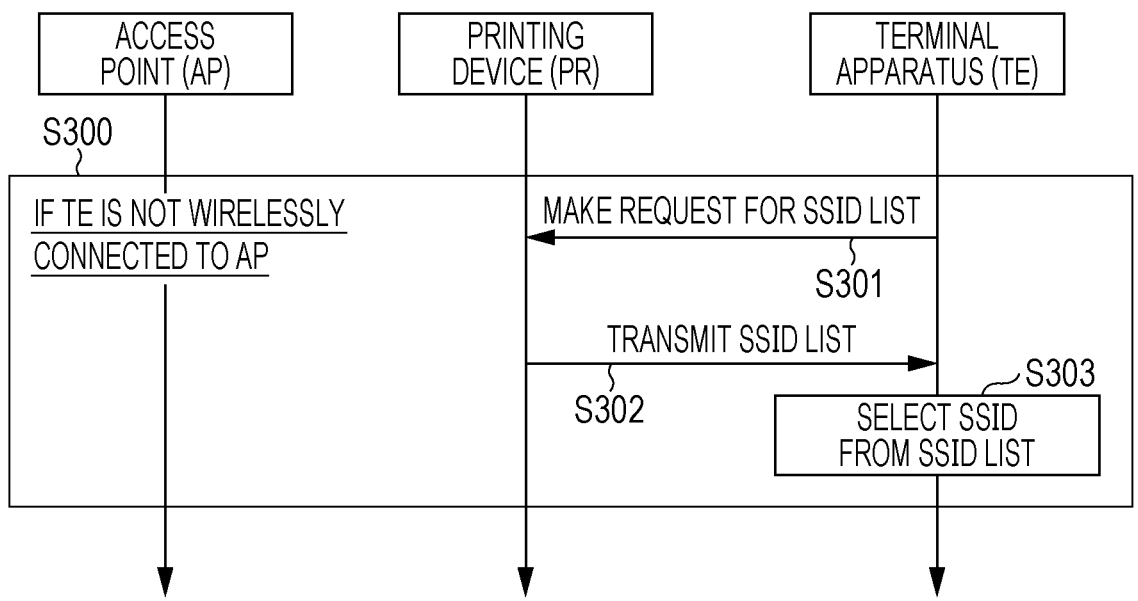
FIG. 6 is a sequence chart for describing operation of the system according to the embodiment.

Case where the Terminal Apparatus is Not Wirelessly Connected to the Access Point Step S300 is described with reference to FIG. 6.

Step S301

In the terminal apparatus 20, the terminal control unit 21*a* makes a request to the printing device 10 for the SSID list 11*b* through the first wireless communication 110.

Step S302

In the printing device 10, in response to a request from the terminal apparatus 20 for the SSID list 11*b*, the device control unit 11*a* transmits the SSID list 11*b*, which is stored in the memory of the processing unit 11, to the terminal apparatus 20 through the first wireless communication 110.

Step S303

In the terminal apparatus 20, when any SSID (the second SSID) is selected from the SSID list 11*b* that is received from the printing device 10 through the first wireless communication 110, the terminal control unit 21*a* causes the processing to proceed to Step S401 in FIG. 7.

A focus is shifted to a description that is to be provided with reference to FIG. 7.

Step S401

When the second SSID is selected, the terminal control unit 21a causes a password input screen (a second password input screen) to be displayed on the touch panel display 24. A password (a second password) of the second SSID is input from the password input screen into the terminal control unit 21a.

Step S402

The terminal control unit 21a transmits the second SSID and the second password to the printing device 10 through the first wireless communication 110.

Step S403

In the printing device 10, the device control unit 11a causes the Wi-Fi communication unit 13 to establish the third wireless communication 130 with the access point 30, based on the second SSID and the second password that are received from the terminal apparatus 20 through the first wireless communication 110.

It is noted that the selection of the second SSID in Step S303, which is described above, is the same as in the methods (1) and (2) of selecting the second SSID in Step S223 in FIG. 5, which is described above.

Furthermore, when "A value of the SSID is NULL" or "A length of the SSID is 0" is written, as the SSID, on the SSID list 11b, the same processing as in <a case where "A value of the SSID is NULL" or "A length of the SSID is 0" is written, as the SSID of the stealth AP, on the SSID list that is received by the terminal apparatus from the printing device> described above is performed.

As described above, according to the present embodiment, in a system 1 that includes a printing device 10 (a device) and a terminal apparatus 20 that establishes first wireless communication 110 with the printing device 10 using a wireless communication scheme (a first wireless communication scheme) that complies with BLE standards, a terminal control unit 21a of the terminal apparatus 20 performs first determination processing that determines whether or not a Wi-Fi communication unit 23 (a second wireless communication unit) establishes second wireless communication 120 with an access point 30.

When it is determined that a result of the determination in the first determination processing is that the Wi-Fi communication unit 23 establishes the second wireless communication 120 with the access point 30, the terminal control unit 21a transmits a first SSID (a first network identifier) of the access point 30, the second wireless communication 120 with which is established by the Wi-Fi communication unit 23, to the printing device 10 through the first wireless communication 110.

Furthermore, a device control unit 11a of the printing device 10 determines whether or not the first SSID that is received from the terminal apparatus 20 through the first wireless communication 110 is included in an SSID list 11b that is acquired by a Wi-Fi communication unit 13 by searching a wireless LAN (a wireless communication network) in compliance with a wireless communication scheme (a second wireless communication scheme) that complies with Wi-Fi standards, and, when it is determined that the first SSID is included, transmits a notification indicating that first SSID is included in the SSID list 11b, to the terminal apparatus 20 through the first wireless communication 110.

Furthermore, a terminal control unit 21a causes a first screen for receiving an instruction for wirelessly connecting the printing device 10 to the access point 30 to which the terminal apparatus 20 is connected, to be displayed on a touch panel display 24 (a display unit or an operation unit), when the notification indicating that the first SSID is included in the SSID list 11b that is stored in the printing device 10 is received from the printing device 10 through the first wireless communication 110, and causes a first password input screen to be displayed on the touch panel display 24 when the notification is received from the first screen, and transmits the first SSID and a first password to the printing device 10 through the first wireless communication 110 when the first password is input from the first password input screen.

Furthermore, the device control unit 11a causes the Wi-Fi communication unit 13 to establish third wireless communication 130 with an access point of which the first SSID is identified, based on the first SSID and the first password that are received from the terminal apparatus 20 through the first wireless communication 110.

When the result in the first determination processing is that the Wi-Fi communication unit 23 does not establish the second wireless communication 120 with the access point 30, the terminal control unit 21a makes a request to the printing device 10 for the SSID list 11b through the first wireless communication 110.

Furthermore, the device control unit 11a transmits the SSID list 11b to the terminal apparatus 20 through the first wireless communication 110 in response to a request from the terminal apparatus 20 for the SSID list 11b.

Furthermore, the terminal control unit 21a causes any second SSID to be selected from the SSID list 11b when the SSID list 11b is received from the printing device 10 through the first wireless communication 110, causes a second password input screen to be displayed on the touch panel display 24 when the second SSID is selected, and transmits the second SSID and a second password to the printing device 10 through the first wireless communication 110 when the second password is input from the second password input screen.

Furthermore, the device control unit 11a causes the Wi-Fi communication unit 13 to establish third wireless communication 130 with the access point 30 of which the second SSID is identified, based on the second SSID and the second password that are received from the terminal apparatus 20 through the first wireless communication 110.

With a configuration according to the present embodiment, when the terminal apparatus 20 is wirelessly connected to the access point 30, in a case where the first SSID is present in the SSID list 11b, the first SSID and the first password that is input by a user through the touch panel display 24 of the terminal apparatus 20 are transmitted from the terminal apparatus 20 to the printing device 10 and the printing device 10 can establish a third wireless communication 130 with the access point 30 of which the first SSID is identified, based on the first SSID and the first password. On the other hand, when the terminal apparatus 20 is not wirelessly connected to the access point 30, the SSID list 11b is sent from the printing device 10 to the terminal apparatus 20 in response to a request from the terminal apparatus 20, the second SSID that is selected from the SSID list 11b and the second password that is input by the user through the touch panel display 24 of the terminal apparatus 20 are transmitted from the terminal apparatus 20 to the printing device 10, and the printing device 10 can establish the third wireless communication 130 with the access point 30 of which the second SSID is identified, based on the second SSID and the second password.

Therefore, according to the present embodiment, when the printing device 10 makes a wireless connection to the access point 30, input of information that is set to be in the access point 30 can be performed using the terminal apparatus 20.

Furthermore, according to the present embodiment, when it is determined that the first SSID is not included in the SSID list 11*b*, the device control unit 11*a* transmits a notification indicating that the first SSID is not included in the SSID list 11*b*, to the terminal apparatus 20 through the first wireless communication 110.

Furthermore, the terminal control unit 21*a* makes a request to the printing device 10 for the SSID list 11*b* through the first wireless communication 110, when the notification indicating that the first SSID is not included in the SSID list 11*b* that is stored by the printing device 10 is received from the printing device 10 through the first wireless communication 110.

Furthermore, the device control unit 11*a* transmits the SSID list 11*b* to the terminal apparatus 20 through the first wireless communication 110 in response to a request from the terminal apparatus 20 for the SSID list 11*b*.

Furthermore, the terminal control unit 21*a* causes any third SSID to be selected from the SSID list 11*b* when the SSID list 11*b* is received from the printing device 10 through the first wireless communication 110, causes a third password input screen to be displayed on the touch panel display 24 when the third SSID is selected, and transmits the third SSID and a third password to the printing device 10 through the first wireless communication 110 when the third password is input from the third password input screen. Furthermore, the device control unit 11*a* causes the Wi-Fi communication unit 13 to establish the third wireless communication 130 with the access point 30 of which the third SSID is identified, based on the third SSID and the third password that are received from the terminal apparatus 20 through the first wireless communication 110.

With a configuration according to the present embodiment, when the terminal apparatus 20 is wirelessly connected to the access point 30, when the first SSID is not present in the SSID list 11*b*, the SSID list 11*b* is sent from the printing device 10 to the terminal apparatus 20 in response to a request from the terminal apparatus 20, the third SSID that is selected from the SSID list 11*b* and the third password that is input by the user through the touch panel display 24 of the terminal apparatus 20 are transmitted from the terminal apparatus 20 to the printing device 10, and the printing device 10 can establish the third wireless communication 130 with the access point 30 of which the third SSID is identified, based on the third SSID and the third password.

Therefore, according to the present embodiment, when the printing device 10 makes a wireless connection to the access point 30, the input of the information that is set to be in the access point 30 can be performed using the terminal apparatus 20.

Furthermore, according to the present embodiment, when an SSID of which a value is NULL or of which a length is 0 is included in the SSID list 11*b*, the device control unit 11*a* transmits the SSID list 11*b* and the stealth access point information indicating that the SSID of the access point which operates in a stealth mode is included in the SSID list 11*b*, to the terminal apparatus 20 through the first wireless communication 110.

Furthermore, the terminal control unit 21*a* causes a fourth SSID and fourth password input screen to be displayed on the touch panel display 24, when the SSID list 11*b* and the stealth access point information are received from the printing device 10 through the first wireless communication 110, and transmits the fourth SSID and the fourth password to the printing device 10 through the first wireless communication 110, when the fourth SSID and a fourth password input screen are input from the fourth SSID and fourth password input screen.

Furthermore, the device control unit 11*a* causes the Wi-Fi communication unit 13 to establish the third wireless communication 130 with the access point 30 of which the fourth SSID is identified, based on the fourth SSID and the fourth password that are received from the terminal apparatus 20 through the first wireless communication 110.

With a configuration according to the present embodiment, when an SSID of which a value is NULL or of which a length is 0 is included in the SSID list 11*b*, the stealth access point information is sent from the printing device 10 to the terminal apparatus 20, the fourth SSID and the fourth password that are input by the user through the touch panel display 24 of the terminal apparatus 20 are transmitted from the terminal apparatus 20 to the printing device 10, and the printing device 10 can establish the third wireless communication 130 with the access point 30 of which the fourth SSID is identified, based on the fourth SSID and the fourth password.

Therefore, according to the present embodiment, when the printing device 10 makes a wireless connection to the access point 30, the input of information that is set to be in the access point 30 can be performed using the terminal apparatus 20. Furthermore, the user can connect the printing device 10 to the wireless LAN using the stealth AP.

Furthermore, according to the present embodiment, the terminal apparatus 20 performs processing that exchanges messages, which are determined in advance according to a second rule that is different from a first rule that is determined with pairing standards for the first wireless communication 110, through the first wireless communication 110 with the printing device 10, and when the printing device 10 has sent the messages that are determined in advance according to the second rule to the terminal apparatus 20, performs information transmission and reception through the first wireless communication 110 with the printing device 10. Furthermore, when the printing device 10 does not have sent the message that are determined in advance according to the second rule to the terminal apparatus 20, the terminal apparatus 20 does not perform the information transmission and reception through the first wireless communication 110 with the printing device 10. The printing device 10 performs processing that exchanges the messages, which are determined in advance according to the second rule which is different from the first rule that is determined with the pairing standards for the first wireless communication 110, through the first wireless communication 110 with the terminal apparatus 20, and when the terminal apparatus 20 has sent the messages that are determined in advance according to the second rule to the printing device 10, performs the information transmission and reception through the first wireless communication 110 with the terminal apparatus 20. Furthermore, when the terminal apparatus 20 does not have sent the message that are determined in advance according to the second rule to the printing device 10, the printing device 10 does not perform the information transmission and reception through the first wireless communication 110 with the terminal apparatus 20.

With a configuration according to the present embodiment, a partner that exchanges information through the first wireless communication 110 between the terminal apparatus 20 and the printing device 10 can be limited to only a partner that has sent the messages that are determined in advance according to the second rule that is different from the first rule which is determined with the pairing standards for the first wireless communication 110.

Therefore, according to the present embodiment, because the legitimacy of the partner that exchanges information through the first wireless communication 110 is verified, the security of the information that is exchanged through the first wireless communication 110 is improved. As a scheme for ensuring the security, generally, a pairing scheme that is determined with standards in compliance with a BLE communication scheme is employed. In the pairing scheme, the user needs to input authentication information, such as a personal identification number (PIN), into the terminal apparatus 20 or the printing device 10. Because of this, the user has to go through the labor of inputting authentication information. On the other hand, according to the present embodiment, because the pairing scheme that is determined with the standards for the BLE communication scheme is not employed, the input of the authentication information is unnecessary, and the user does not have to go through the labor of inputting the authentication information. Moreover, by exchanging the messages described above, the fixed security is ensured in such a manner that information is not exchanged between an unrelated terminal and an apparatus.

As described above, according to the present embodiment, when the printing device 10 makes a wireless connection to the access point 30, input of the information that is set to be in the access point 30 can be performed using the terminal apparatus 20. Accordingly, although a touch panel of a device, such as a multi-function machine or a printing device is small in size, using the terminal apparatus, an SSID can be selected and a password of the SSID can be input. Because of this, an effect in which the user-friendliness is improved is obtained. Furthermore, even when a touch panel is not attached to a device, using the terminal apparatus, an SSID can be selected and a password of the SSID can be input. Because of this, from the device, the SSID and the password can be set to in the access point. Thus, an effect in which the device can be wirelessly connected to the access point is obtained.

Any Other Operation Example when the Terminal Apparatus is Not Wirelessly Connected to the Access Point Next, any other operation example when the terminal apparatus is not wirelessly connected to the access point in the system 1 according to the present embodiment is described with reference to FIGS. 8 to 11. FIGS. 8 to 11 are sequence flowcharts for describing any other operation example when the terminal apparatus is not wirelessly connected to the access point. In FIGS. 8 to 11, an AP refers to the access point 30, a PR refers to the printing device 10, and a TE refers to the terminal apparatus 20.

Figure 8:
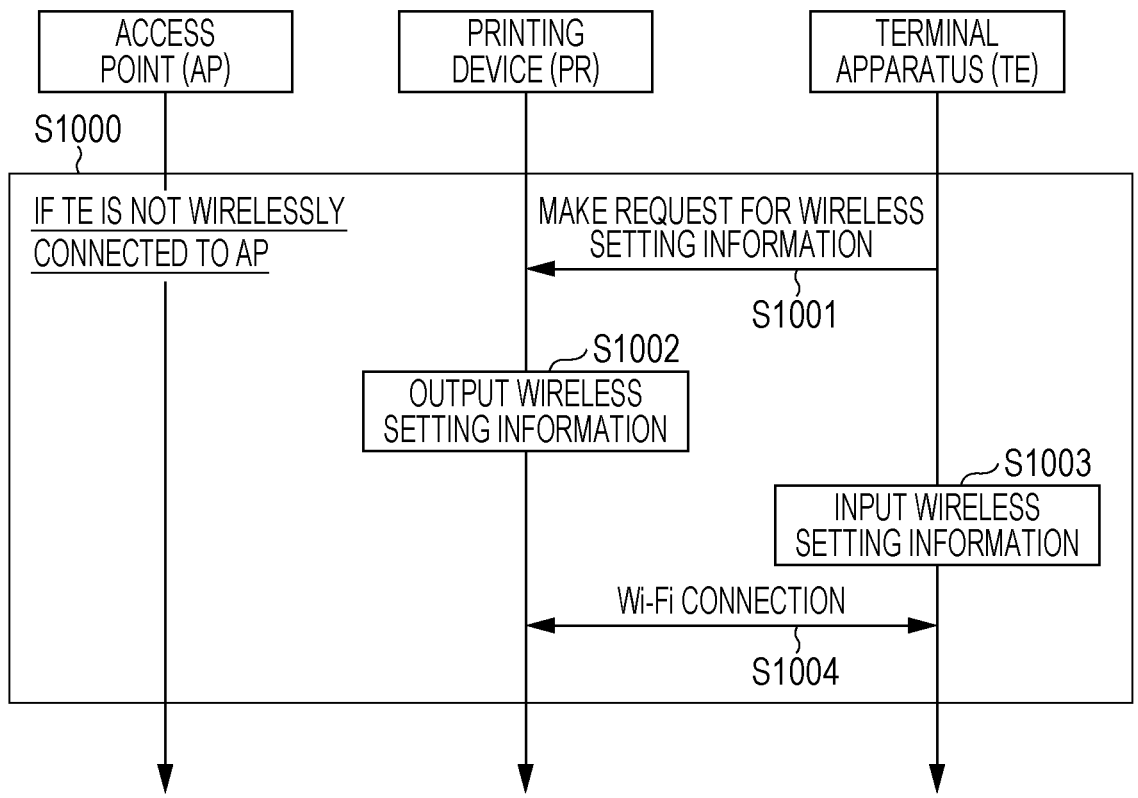
FIG. 8 is a sequence chart for describing the operation of the system according to the embodiment.

When it is determined that the result of the determination in Step S108 in FIG. 4, which is described above, is that the Wi-Fi communication unit 23 of the terminal apparatus 20 does not establish the second wireless communication 120 with the access point 30, the processing is caused to proceed to Step S1000 in FIG. 8.

Step S1000 is described with reference to FIG. 8.

Step S1001

In the terminal apparatus 20, the terminal control unit 21a makes a request to the printing device 10 for wireless setting information that is to be used for establishing the for fourth wireless communication with the printing device 10 in compliance with the wireless communication scheme that complies with the Wi-Fi standards, through the first wireless communication 110. The fourth wireless communication is wireless communication that is established between the terminal apparatus 20 and the printing device 10 using the wireless communication scheme that complies with the Wi-Fi standards, and is wireless communication in which the access point 30 is not involved.

Step S1002

In the printing device 10, the device control unit 11a outputs the wireless setting information in response to a request from the terminal apparatus 20 for the wireless setting information. A method of outputting the wireless setting information may be by displaying a screen on the touch panel display 14, or may be by performing printing using the printing unit 15.

Step S1003

In the terminal apparatus 20, the wireless setting information that is output from the printing device 10 is input into the terminal control unit 21a.

Step S1004

The terminal control unit 21a of the terminal apparatus 20 and the device control unit 11a of the printing device 10 establish the fourth wireless communication using the wireless setting information.

It is noted that, when an application dedicated for establishing the fourth wireless communication is provided in the printing device 10, the terminal control unit 21a of the terminal apparatus 20 makes a request to the printing device 10 to enable the dedicated application, through the first wireless communication 110, prior to Step S1001 described above. The device control unit 11a of the printing device 10 activates the dedicated application in response to the request.

According to "any other operation example when the terminal apparatus is not wirelessly connected to the access point" that pertains to FIG. 8, which is referred to above for description, when it is determined that the result of the determination in Step S108 in FIG. 4 is that the Wi-Fi communication unit 23 of the terminal apparatus 20 does not establish the second wireless communication 120 with the access point 30, the terminal control unit 21a of the terminal apparatus 20 makes a request to the printing device 10 for the wireless setting information that is to be used to establish the fourth wireless communication with the printing device 10 using the wireless communication scheme (the second wireless communication scheme) that complies with the Wi-Fi standards, through the first wireless communication 110, and establishes the fourth wireless communication with the printing device 10 using the wireless setting information that is output from the printing device 10.

With this configuration, when the terminal apparatus 20 does not establish the second wireless communication 120 with the access point 30, an effect in which printing can be simply performed is obtained. The effect is described. When the terminal apparatus 20 does not establish the second wireless communication 120 with the access point 30, although the printing device 10 is caused to establish the third wireless communication 130 with the access point 30, wireless communication cannot be performed through the access point 30 between the terminal apparatus 20 and the printing device 10. Because of this, the print data cannot be transmitted from the terminal apparatus 20 to the printing device 10 through the access point 30. For this reason, a procedure for causing the terminal apparatus 20 to establish the second wireless communication 120 with the access point 30 is separately necessary, or the labor is involved until printing is performed. On the other hand, according to any other operation example that pertains to FIG. 8, when the terminal apparatus 20 does not establish the second wireless communication 120 with the access point 30, the fourth wireless communication is established between the terminal apparatus 20 and the printing device 10. Because of this, the print data can be transmitted from the terminal apparatus 20 to the printing device 10 using the fourth wireless communication, and the printing can be simply performed.

First Specific Example of Step S1000

A first specific example (Step S1000a) of Step S1000 is described with reference to FIG. 9. In the first specific example of Step S1000, the terminal apparatus 20 includes a first operating system (OS). In the terminal apparatus 20, the terminal control unit 21a is realized on the first OS.

Figure 9:
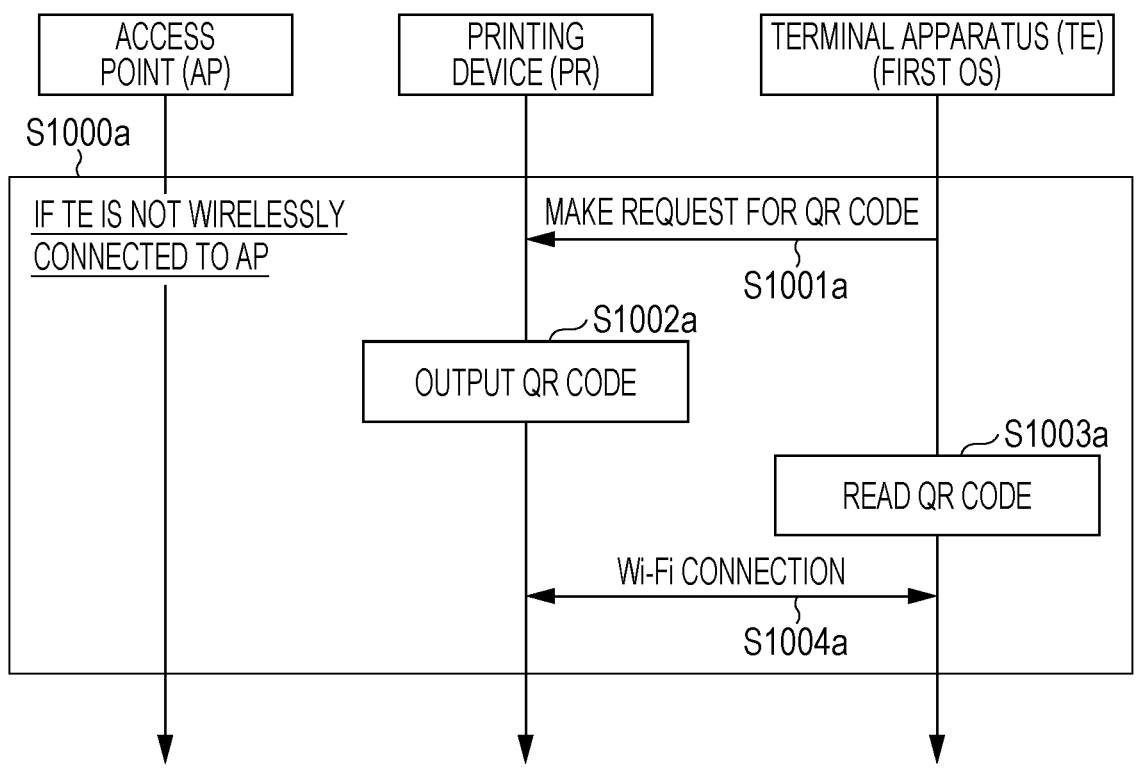
FIG. 9 is a sequence chart for describing the operation of the system according to the embodiment.

When it is determined that the result of the determination in Step S108 in FIG. 4, which is described above, is that the Wi-Fi communication unit 23 of the terminal apparatus 20 does not establish the second wireless communication 120 with the access point 30, the processing is caused to proceed to Step S1000a in FIG. 9.

Step S1000a is described with reference to FIG. 9.

Step S1001a

In the terminal apparatus 20, the terminal control unit 21a makes a request to the printing device 10 for a QR code (a registered trademark) that includes an SSID (hereinafter referred to a fifth SSID) and a password (hereinafter referred to as a fifth password) that are to be used to establish the fourth wireless communication, through the first wireless communication 110. The QR code is an example of a two-dimensional code.

Step S1002a

In the printing device 10, the device control unit 11a outputs the QR code in response to a request from the terminal apparatus 20 for the QR code. A method of outputting the QR code may be by displaying a screen on the touch panel display 14, or may be performing the printing using the printing unit 15.

Step S1003a

In the terminal apparatus 20, the terminal control unit 21a reads the QR code that is output from the printing device 10. The terminal apparatus 20 includes an image capture module. A method of reading the QR code is by reading the QR code using the image capture module. The terminal control unit 21a acquires a fifth SSID and a fifth password from the QR code that is read. It is noted that the image capture module may be an image capture unit that includes a CCD camera or the like, and may be an image capture that includes a CMOS sensor or the like.

Step S1004a

The terminal control unit 21a of the terminal apparatus 20 and the device control unit 11a of the printing device 10 establishes the fourth wireless communication using the fifth SSID and the fifth password.

It is noted that, when the application dedicated for establishing the fourth wireless communication is set to be in the printing device 10, the terminal control unit 21a of the terminal apparatus 20 makes a request to the printing device 10 to enable the dedicated application, through the first wireless communication 110, prior to Step S1001a described above. The device control unit 11a of the printing device 10 activates the dedicated application in response to the request.

According to "any other operation example when the terminal apparatus is not wirelessly connected to the access point" that pertains to FIG. 9, which is referred to above for description, when it is determined that the result of the determination in Step S108 in FIG. 4 is that the Wi-Fi communication unit 23 of the terminal apparatus 20 does not establish the second wireless communication 120 with the access point 30, the terminal control unit 21a of the terminal apparatus 20 makes a request to the printing device 10 for the QR code (the two-dimensional code) that includes a fifth network identifier and the fifth password that are to be used to establish the fourth wireless communication with the printing device 10 using the wireless communication scheme (the second wireless communication scheme) that complies with the Wi-Fi standards, through the first wireless communication 110, causes the image capture module to read the QR code that is output from the printing device 10, acquires the fifth network identifier and the fifth password from the QR code that is read by the image capture module, and establishes the fourth wireless communication with the printing device 10 using the fifth network identifier and the fifth password that are acquired.

With this configuration, in the same manner as in any other operation example that pertains to FIG. 8, which is referred to above for description, when the terminal apparatus 20 does not establish the second wireless communication 120 with the access point 30, the print data can be transmitted from the terminal apparatus 20 to the printing device 10 using the fourth wireless communication with the printing device 10, and an effect in which the printing can be simply performed is obtained. Furthermore, by reading the QR code (the two-dimensional code), the fifth network identifier and the fifth password that are to be used to establish the fourth wireless communication can be acquired. Because of this, wireless setting is simple.

Second Specific Example of Step S1000

Second specific example (Step S1000b) of Step S1000 is described with reference to FIG. 10. In the second specific example of Step S1000, the terminal apparatus 20 includes a second operating system (OS). In the terminal apparatus 20, the terminal control unit 21a is realized on a second OS.

Figure 10:
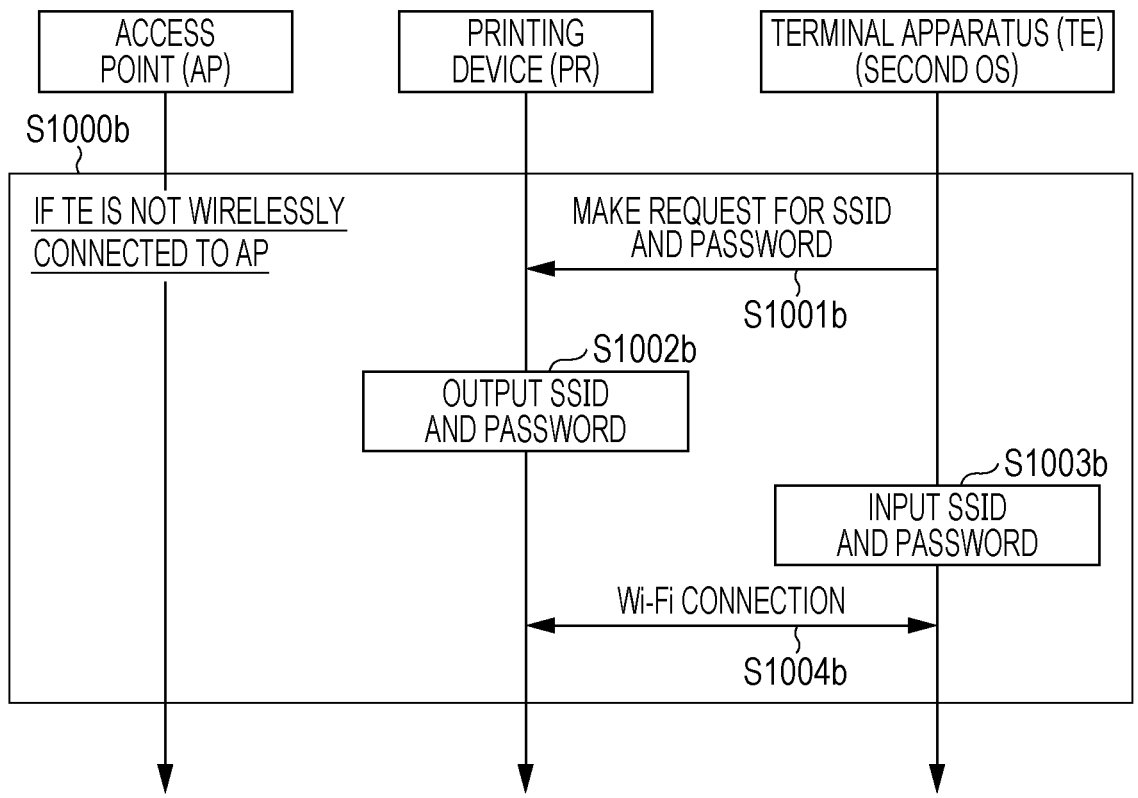
FIG. 10 is a sequence chart for describing the operation of the system according to the embodiment.

When it is determined that the result of the determination in Step S108 in FIG. 4, which is described above, is that the Wi-Fi communication unit 23 of the terminal apparatus 20 does not establish the second wireless communication 120 with the access point 30, the processing is caused to proceed to Step S1000b in FIG. 10.

Step S1000b is described with reference to FIG. 10.

Step S1001b

In the terminal apparatus 20, the terminal control unit 21a makes a request to the printing device 10 for the fifth SSID and the fifth password that are to be used to establish the fourth wireless communication, through the first wireless communication 110.

Step S1002b

In the printing device 10, the device control unit 11a outputs the fifth SSID and the fifth password in response to a request from the terminal apparatus 20 for the fifth SSID and the fifth password. A method of outputting the fifth SSID and the fifth password may be by displaying a screen on the touch panel display 14, or may be performing the printing using the printing unit 15.

Step S1003b

In the terminal apparatus 20, the terminal control unit 21a causes an SSID and password input screen to be displayed on the touch panel display 24. The fifth SSID and the fifth password are input from the SSID and password input screen into the terminal control unit 21a.

Step S1004b

The terminal control unit 21a of the terminal apparatus 20 and the device control unit 11a of the printing device 10 establish the fourth wireless communication using the fifth SSID and the fifth password.

It is noted that, when the application dedicated for establishing the fourth wireless communication is set to be in the printing device 10, the terminal control unit 21a of the terminal apparatus 20 makes a request to the printing device 10 to enable the dedicated application, through the first wireless communication 110, prior to Step S1001b described above. The device control unit 11a of the printing device 10 activates the dedicated application in response to the request.

According to "any other operation example when the terminal apparatus is not wirelessly connected to the access point" that pertains to FIG. 10, which is referred to above for description, when it is determined that the result of the determination in Step S108 in FIG. 4 is that the Wi-Fi communication unit 23 of the terminal apparatus 20 does not establish the second wireless communication 120 with the access point 30, the terminal control unit 21a of the terminal apparatus 20 makes a request to the printing device 10 for the fifth network identifier and the fifth password that are to be used to establish the fourth wireless communication with the printing device 10 using the wireless communication scheme (the second wireless communication scheme) that complies with the Wi-Fi standards, through the first wireless communication 110, causes the SSID and password input screen to be displayed on the touch panel display 24 (a display unit), and, when the fifth network identifier and the fifth password are input from the SSID and password input screen, establishes the fourth wireless communication with the printing device 10 using the fifth network identifier and the fifth password.

With this configuration, in the same manner as in any other operation example that pertains to FIG. 8, which is referred to above for description, when the terminal apparatus 20 does not establish the second wireless communication 120 with the access point 30, the print data can be transmitted from the terminal apparatus 20 to the printing device 10 using the fourth wireless communication with the printing device 10, and an effect in which the printing can be simply performed is obtained.

Third Specific Example of Step S1000

A third specific example (Step S1000c) of Step S1000 is described with reference to FIG. 11. In the third specific example of Step S1000, the terminal apparatus 20 includes a third operating system (OS). In the terminal apparatus 20, the terminal control unit 21a is realized on the third OS.

Figure 11:
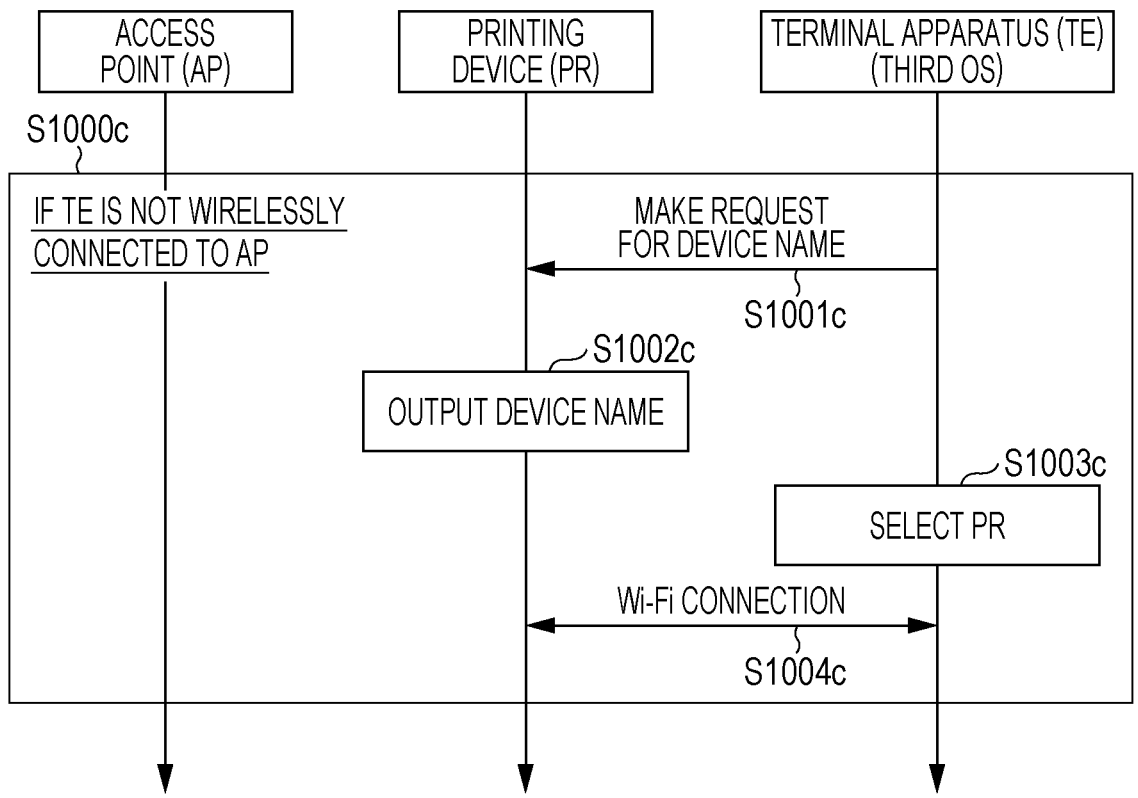
FIG. 11 is a sequence chart for describing the operation of the system according to the embodiment.

When it is determined that the result of the determination in Step S108 in FIG. 4, which is described above, is that the Wi-Fi communication unit 23 of the terminal apparatus 20 does not establish the second wireless communication 120 with the access point 30, the processing is caused to proceed to Step S1000c in FIG. 11.

Step S1000c is described with reference to FIG. 11.

Step S1001c

In the terminal apparatus 20, the terminal control unit 21a makes a request to the printing device 10 for a device name of the printing device 10 that is to be used to establish the fourth wireless communication, through the first wireless communication 110.

Step S1002c

In the printing device 10, the device control unit 11a outputs the device name of the printing device 10 in response to the request from the terminal apparatus 20 for the device name. A method of outputting the device name may be by displaying a screen on the touch panel display 14, or may be performing the printing using the printing unit 15. The device name of the printing device 10 may be a string of characters that uniquely specifies the printing device 10, and may be set to be an arbitrary string of characters. An example is given in which a device name of one printing device 10 of two printing devices 10 is set to be "printer 01" and in which a device name of the other printing device 10 is set to be "printer 02". Furthermore, the fifth SSID may be set as the device name of the printing device 10. If the fifth SSID is set as the device name of the printing device 10, it is easy for the user to specify the printing device 10 that is a connection destination of the terminal apparatus 20.

Step S1003c

In the terminal apparatus 20, the terminal control unit 21a causes a device name selection screen to be displayed on the touch panel display 24. It is possible that multiple device names are displayed, as selection targets, on the device name selection screen. Device names that are displayed, as selection targets, on the device name selection screen are device names that were collected by the terminal apparatus 20 in the past. Regarding the device name that was collected by the terminal apparatus 20 in the past, the terminal apparatus 20 received a beacon that was transmitted from the printing device 10 and acquired a device name that is included in the beacon.

The terminal control unit 21a receives the device name of the printing device 10, which is selected from the device name selection screen.

Step S1004c

The terminal control unit 21a of the terminal apparatus 20 and the device control unit 11a of the printing device 10 establish the fourth wireless communication using the device name of the printing device 10. In the present step S1004c, password authentication is omitted in establishing the fourth wireless communication.

It is noted that, in a procedure for establishing the fourth wireless communication, the device control unit 11a may cause an approval selection screen for establishing the fourth wireless communication, to be displayed on the touch panel display 24, and may receive approval for establishing the fourth wireless communication, through the approval selection screen. Accordingly, in Step S1004c, the password authentication is omitted in establishing the fourth wireless communication, but because approval of the establishment of the fourth wireless communication can be received from the user, the legitimacy of the establishment of the fourth wireless communication can be ensured.

Furthermore, when the application dedicated for establishing the fourth wireless communication is provided in the printing device 10, the terminal control unit 21a of the terminal apparatus 20 makes a request to the printing device 10 to enable the dedicated application, through the first wireless communication 110, prior to Step S1001c described above. The device control unit 11a of the printing device 10 activates the dedicated application in response to the request.

According to "any other operation example when the terminal apparatus is not wirelessly connected to the access point" that pertains to FIG. 11, which is referred to above for description, when it is determined that the result of the determination in Step S108 in FIG. 4 is that the Wi-Fi communication unit 23 of the terminal apparatus 20 does not establish the second wireless communication 120 with the access point 30, the terminal control unit 21a of the terminal apparatus 20 makes a request to the printing device 10 for the device name of the printing device 10 that is to be used to establish the fourth wireless communication with the printing device 10 using the wireless communication scheme (the second wireless communication scheme) that complies with Wi-Fi standards, through the first wireless communication 110, causes the device name selection screen to be displayed on the touch panel display 24 (the display unit), and, when the device name of the printing device 10 that is selected from the device name selection screen is received, establishes the fourth wireless communication with the printing device 10 using the selected device name.

With this configuration, in the same manner as in any other operation example that pertains to FIG. 8, which is referred to above for description, when the terminal apparatus 20 does not establish the second wireless communication 120 with the access point 30, the print data can be transmitted from the terminal apparatus 20 to the printing device 10 using the fourth wireless communication with the printing device 10, and an effect in which the printing can be simply performed is obtained. Furthermore, with the selection of the device name of the printing device 10, the fourth wireless communication can be established. Because of this, the wireless setting is simple.

The embodiment of the invention has been described in detail above with reference to the drawings, but specific configurations are not limited to the embodiment and include alteration, substitution, deletion, and the like, as long as they do not depart from the gist of the disclosure.

Furthermore, a program for realizing a function of an arbitrary constituent unit of the apparatus (for example, the printing device 10 or the terminal apparatus 20) described above may be recorded on a computer-readable recording medium, and the program may be executed by being read by a computer system. It is noted that the "computer system" here may include an operating system (OS) or hardware such as a peripheral device. Furthermore, the "computer-readable recording medium" refers to a portable medium, such as a flexible disk, a magneto-optical disk, a rewritable nonvolatile memory such as a ROM or a flash memory, or a digital versatile disc (DVD), or refers to a storage device such as a hard disk, that is mounted into the computer system. Moreover, the "computer-readable recording media" are defined as also including a medium that retains the program for a short period of time, such as a volatile memory (for example, a dynamic random access memory (DRAM)) within the computer system that is a server or a client computer when the program is transmitted through a network such as the Internet or through a communication line such as a telephone line. Furthermore, the program described above may be transferred from the computer system, which stores the program in the storage device or the like, to any other computer system through a transfer medium or over a transfer wave in the transfer medium. At this point, the "transfer medium" that transfer the program refers to a medium that has a function of transferring information, like a network (a communication network) such as the Internet, or a communication line such as a telephone line. Furthermore, the program described may be one for realizing a portion of the function described above. Moreover, the program described above can be realized by combining the function described above with a program that is already recorded in the computer system, but may be a so-called differential file (a differential program).

Furthermore, a function of an arbitrary constituent unit in the apparatus (for example, the printing device 10 or the terminal apparatus 20) described above can be realized by a processor (a processor that includes hardware). For example, each processing operation according to the present embodiment can be realized by a processor that operates based on information of a program or the like, and a computer-readable recording medium on which the information in the program or the like is stored. A function of each unit of the processor here may be realized in individual hardware, or a function of each unit thereof may be realized in integrated hardware. For example, the processor includes hardware, and the hardware can include at least one of a circuit that processes a digital signal and a circuit that processes an analog signal. For example, the processor can be configured with one or multiple circuit devices (for example, ICs or the like) that are mounted on a circuit substrate, or with one or multiple circuit elements (for example, a resistor, a capacitor, and the like). The processor, for example, may be a CPU. However, the processor is not limited to the CPU, and it is possible that various processors are used such as a graphics processing unit (GPU) and a digital signal processor (DSP) are used. Furthermore, the processor may be a hardware circuit such as an application specific integrated circuit (ASIC). Furthermore, the processor may be configured with multiple CPUs, and may be configured with hardware circuits such as multiple ASICs. Furthermore, the processor may be configured with a combination of multiple CPUs and hardware circuits such as multiple ASICs. Furthermore, the processor may include an amplification circuit, a filter circuit, or the like that processes an analog signal.

The entire disclosure of Japanese Patent Applications No. 2018-059833, filed Mar. 27, 2018 and No. 2018-100061, filed May 24, 2018 are expressly incorporated by reference herein.

What is claimed is:
1. A terminal apparatus that establishes first wireless communication with a device using a first wireless communication scheme, by a first wireless communication unit, the terminal apparatus comprising:
 a second wireless communication unit that performs processing which establishes a second wireless communication with an access point on a wireless communication network using a second wireless communication scheme;
 a display unit on which a screen is displayed;
 an operation unit that receives input from the screen; and
 a terminal control unit, wherein;
 the terminal control unit performs first determination processing which determines whether or not the second wireless communication unit establishes the second wireless communication with the access point,
 when it is determined that a result of the first determination processing is that the second wireless communication unit establishes the second wireless communication with the access point, the terminal control unit transmits a first network identifier of the access point, the second wireless communication with which is established by the second wireless communication unit, to the device through the first wireless communication,
 the terminal control unit causes a first screen for receiving an instruction for wirelessly connecting the device to the access point to which the terminal apparatus is connected, to be displayed on the display unit,
 the first network identifier of the access point contained in the first wireless communication causes the device to determine whether the first network identifier is included in a list of network identifiers that is acquired by searching the wireless communication network and stored in the device,
 when the first network identifier is included in the list of network identifiers, the device is caused to send a success notification to the terminal apparatus via the first wireless communication,
 when the success notification is received from the device through the first wireless communication, the terminal control unit causes a first password input screen to be displayed on the display unit when the instruction is received from the first screen, and the terminal control unit transmits the first network identifier and a first password to the device through the first wireless communication when the first password is input from the first password input screen, when the first network identifier is not included in the list of network identifiers, the device is caused to send a failure notification to the terminal apparatus via the first wireless communication, in response to receiving the failure notification, the terminal control unit sends a request for the list of network identifiers to the device, and when the list of network identifiers is received, the terminal control unit causes the list of the network identifiers to be displayed on the display unit, and the terminal control unit causes any second network identifier to be selected from the list of network identifiers when the list of network identifiers is received from the device through the first wireless communication, causes a second password input screen to be displayed on the display unit when the second network identifier is selected, and transmits the second network identifier and a second password to the device through the first wireless communication when the second password is input from the second password input screen.

2. The terminal apparatus according to claim 1, wherein when it is determined that the result of the first determination processing is that the second wireless communication unit does not establish the second wireless communication with the access point, the terminal control unit makes a request to the device for wireless setting information that is to be used to establish a third wireless communication with the device in compliance with the second wireless communication scheme, through the first wireless communication, and establishes the third wireless communication with the device using the wireless setting information that is output from the device.

3. The terminal apparatus according to claim 2, wherein when it is determined that the result of the first determination processing is that the second wireless communication unit does not establish the second wireless communication with the access point, the terminal control unit makes a request to the device for a two-dimensional code that includes a second network identifier and a second password which are to be used to establish the third wireless communication, through the first wireless communication, causes an image capture module to read the two-dimensional code that is output from the device, acquires the second network identifier and the second password from the two-dimensional code that is read by the image capture module, and establishes the third wireless communication with the device using the second network identifier and the second password that are acquired.

4. The terminal apparatus according to claim 2, wherein when it is determined that the result of the first determination processing is that the second wireless communication unit does not establish the second wireless communication with the access point, the terminal control unit makes a request to the device for a second network identifier and a second password that are to be used to establish the third wireless communication, through the first wireless communication, causes a network identifier and password input screen to be displayed on the display unit, and establishes the third wireless communication with the device using the second network identifier and the second password, when the second network identifier and the second password are input from the network identifier and password input screen.

5. The terminal apparatus according to claim 4, wherein when it is determined that the result of the first determination processing is that the second wireless communication unit does not establish the second wireless communication with the access point, the terminal control unit makes a request to the device for a device name of the device, which is to be used to establish the third wireless communication, through the first wireless communication, causes a device name selection screen to be displayed on the display unit, and establishes the third wireless communication with the device using the selected device name when the device name of the device selected from the device name selection screen is received.

6. The terminal apparatus according to claim 1, wherein the terminal control unit causes a second network identifier and second password input screen to be displayed on the display unit when the list of network identifiers and stealth access point information indicating that the network identifier of the access point which operates in a stealth mode is included in the list of the network identifiers are received from the device through the first wireless communication, and transmits the second network identifier and the second password to the device through the first wireless communication when the second network identifier and the second password are input from the second network identifier and second password input screen.

7. The terminal apparatus according to claim 1, wherein the terminal apparatus:

performs processing that exchanges a message through the first wireless communication with the device, when the message satisfies a predetermined rule, performs information transmission and reception through the first wireless communication with the device, and when the message does not satisfy the predetermined rule, does not perform the information transmission and reception through the first wireless communication with the device.

8. A non-transitory computer-readable recording medium in which a program is recorded, the program that causes a computer to perform:

causing a first wireless communication unit to establish first wireless communication with a device using a first wireless communication scheme;

determining whether or not a second wireless communication unit establishes second wireless communication with an access point on a wireless communication network using a second wireless communication scheme;

causing the first wireless communication unit to transmit a first network identifier of the access point to the device through the first wireless communication when it is determined that a result of the determination is the second wireless communication unit establishes second wireless communication with the access point;

causing a first screen for receiving an instruction for wirelessly connecting the device to the access point to be displayed on a display unit, wherein the first network identifier of the access point contained in the first wireless communication causes the device to determine whether the first network identifier is included in a list of network identifiers that is acquired by searching the wireless communication network and stored in the device, when the first network identifier is included in the list of network identifiers, the device is caused to send a success notification to the computer via the first wireless communication, otherwise, the device is caused to send a failure notification via the first wireless communication;

when the first wireless communication receives a success notification, causing a first password input screen to be displayed on the display unit when the first screen receives the instruction;

causing the first wireless communication unit to transmit the first network identifier and a first password to the device through the first wireless communication, when the first password is input into the first password input screen;

when the first network identifier is not included in the list of network identifiers, sending a failure notification via the first wireless communication, in response to receiving the failure notification, sending a request for the list of network identifiers to the device, when the list of network identifiers is received, causing the list of the network identifiers to be displayed on the display unit;

causing any second network identifier to be selected from the list of network identifiers when the list of network identifiers is received from the device through the first wireless communication;

causing a second password input screen to be displayed on the display unit when the second network identifier is selected; and transmitting the second network identifier and a second password to the device through the first wireless communication when the second password is input from the second password input screen.

* * * * *